(12) United States Patent
Lam et al.

(10) Patent No.: US 9,098,328 B2
(45) Date of Patent: Aug. 4, 2015

(54) SYSTEMS AND METHODS FOR EVENT STREAM PROCESSING

(75) Inventors: Wang Chee Lam, San Jose, CA (US); Lu Liu, Princeton, NJ (US); Taraka Subrahmanya Prasad Siripurapu, Saratoga, CA (US); Anand Rajaraman, Palo Alto, CA (US); Zoheb Vacheri, Sunnyvale, CA (US); AnHai Doan, Madison, WI (US)

(73) Assignee: Wal-Mart Stores, Inc., Bentonville, AR (US)

( * ) Notice: Subject to any disclaimer, the term of this patent is extended or adjusted under 35 U.S.C. 154(b) by 413 days.

(21) Appl. No.: 13/553,640

(22) Filed: Jul. 19, 2012

(65) Prior Publication Data
US 2013/0347005 A1  Dec. 26, 2013

Related U.S. Application Data

(60) Provisional application No. 61/664,658, filed on Jun. 26, 2012.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/48* | (2006.01) |
| *G06F 9/54* | (2006.01) |

(52) U.S. Cl.
CPC .......... *G06F 9/4843* (2013.01); *G06F 9/4881* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 7,512,829 B2 | 3/2009 | Mital | |
| 7,756,919 B1 * | 7/2010 | Dean et al. | 709/201 |
| 8,260,803 B2 | 9/2012 | Hsu | |
| 8,745,434 B2 * | 6/2014 | Yang et al. | 714/4.1 |
| 2009/0287628 A1 | 11/2009 | Indeck | |
| 2011/0154339 A1 * | 6/2011 | Lee et al. | 718/100 |
| 2012/0311562 A1 | 12/2012 | Wang | |

* cited by examiner

*Primary Examiner* — Emerson Puente
*Assistant Examiner* — Kacy Verdi
(74) *Attorney, Agent, or Firm* — Bryan Cave LLP

(57) ABSTRACT

Disclosed are systems and methods for processing events in an event stream using a map-update application. The events may be embodied as a key-attribute pair. An event is processed by one or more instances implementing either a map or an update function. A map function receives an input event from the event stream and publishes one or more events to the event stream. An update function receives an event and updates a corresponding slate and publishes zero or more events. Systems and methods are also disclosed herein for implementing a map-update application in a multithreaded architecture and for handling overloading of a particular thread or node. Systems and methods for providing access to slates updated according to update operations are also disclosed.

14 Claims, 21 Drawing Sheets

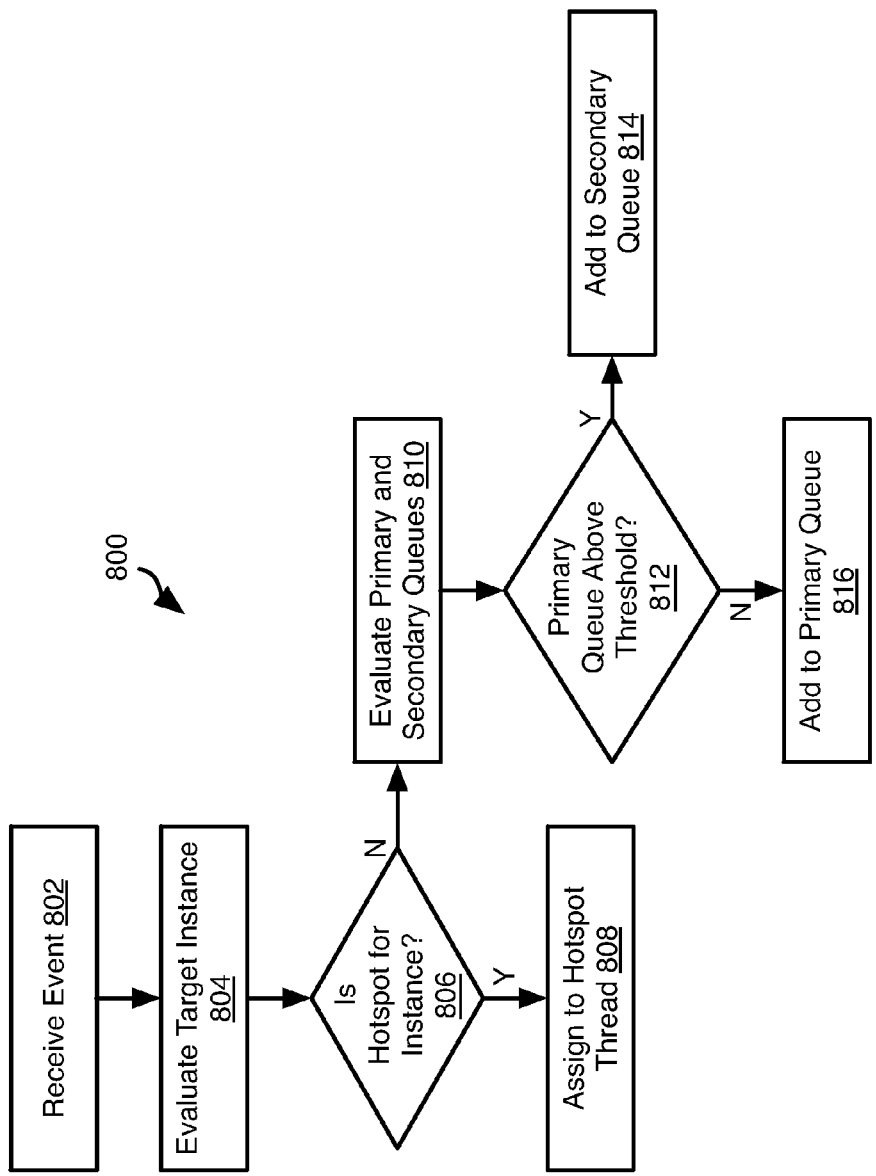

SYSTEMS AND METHODS FOR EVENT STREAM PROCESSING

RELATED APPLICATIONS

This application claims the benefit of U.S. Provisional Application Ser. No. 61/664,658, filed Jun. 26, 2012, which is hereby incorporated herein by reference in its entirety. This application is related to U.S. application Ser. No. 13/553,629, filed Jul. 19, 2012, U.S. application Ser. No. 13/553,606, filed Jul. 19, 2012, U.S. application Ser. No. 13/553,651 filed Jul. 19, 2012, and U.S. application Ser. No. 13/553,652, filed Jul. 19, 2012. All applications are incorporated herein by reference for all purposes.

BACKGROUND

1. Field of the Invention

This invention relates to systems and methods for processing a stream of events.

2. Background of the Invention

MapReduce has emerged as a popular method for processing large data sets or "big data." Using MapReduce, a developer simply writes a map function and a reduce function. The system automatically distributes the workload over a cluster of commodity machines, monitors the execution, and handles failures. In the past few years, however, not just big data, but fast data, i.e., high-speed real-time and near-real-time data streams, has also exploded in volume and availability. Prime examples include sensor data streams, real-time stock market data, and social-media feeds such as Twitter, Facebook, YouTube, Foursquare, and Flickr. The emergence of social media in particular has greatly fueled the growth of fast data, with well over 4000 tweets per second (400 million tweets per day), 3 billion Facebook likes and comments per day, and 5 million Foursquare checkins per day.

Numerous applications that deal with these and similar data streams must process fast data, often with minimal latency and high scalability. For example, an application that monitors the Twitter Firehose for an ongoing earthquake may want to report relevant information within a few seconds of when a tweet appears, and must handle drastic spikes in the tweet volumes.

MapReduce is not particularly suited for fast data. First, MapReduce runs on a static snapshot of a data set, while stream computations proceed over an evolving data stream. In MapReduce, the input data set does not (and cannot) change between the start of the computation and its finish, and no reducer's input is ready to run until all mappers have finished. In stream computations, the data is changing all the time; there is no such thing as working with a "snapshot" of a stream. Second, every MapReduce computation has a "start" and a "finish." In contrast, stream computations never end—the data stream goes on forever. In the MapReduce model, the reduce step needs to see a key and all the values associated with the key; this is impossible in a streaming model.

Accordingly, what is needed is an improved method for performing a map-reduce type operation for streaming data with very low latency.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 8 is a process flow diagram of a method for enqueuing an event in accordance with an embodiment of the present invention;

DETAILED DESCRIPTION

Figure 1:
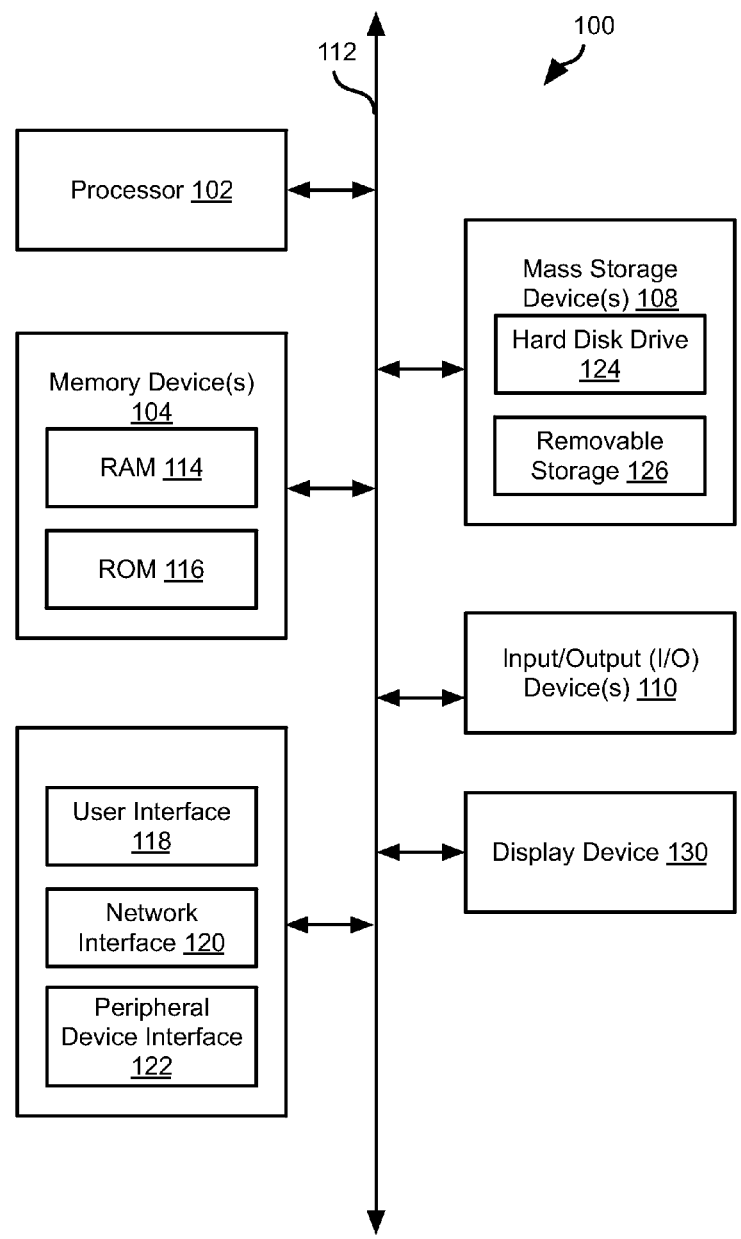
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Systems and methods are disclosed herein for processing events in an event stream using a map-update application. The events may be embodied as a key→attribute pair. In embodiments disclosed herein, an event embodied as a key→attribute pair may also be replaced with, or otherwise embodied, as a key→opaque value pair as might be used in a MapReduce application as known in the art. An event is processed by one or more instances implementing either a map or an update function. A map function receives an input event from the event stream and publishes one or more events to the event stream. An update function receives an event and updates a corresponding slate and publishes zero or more events.

Systems and methods are also disclosed herein for implementing a map-update application in a multithreaded architecture and preventing overloading of a particular thread. Also disclosed are other methods for dealing with overloading due to large event volumes.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
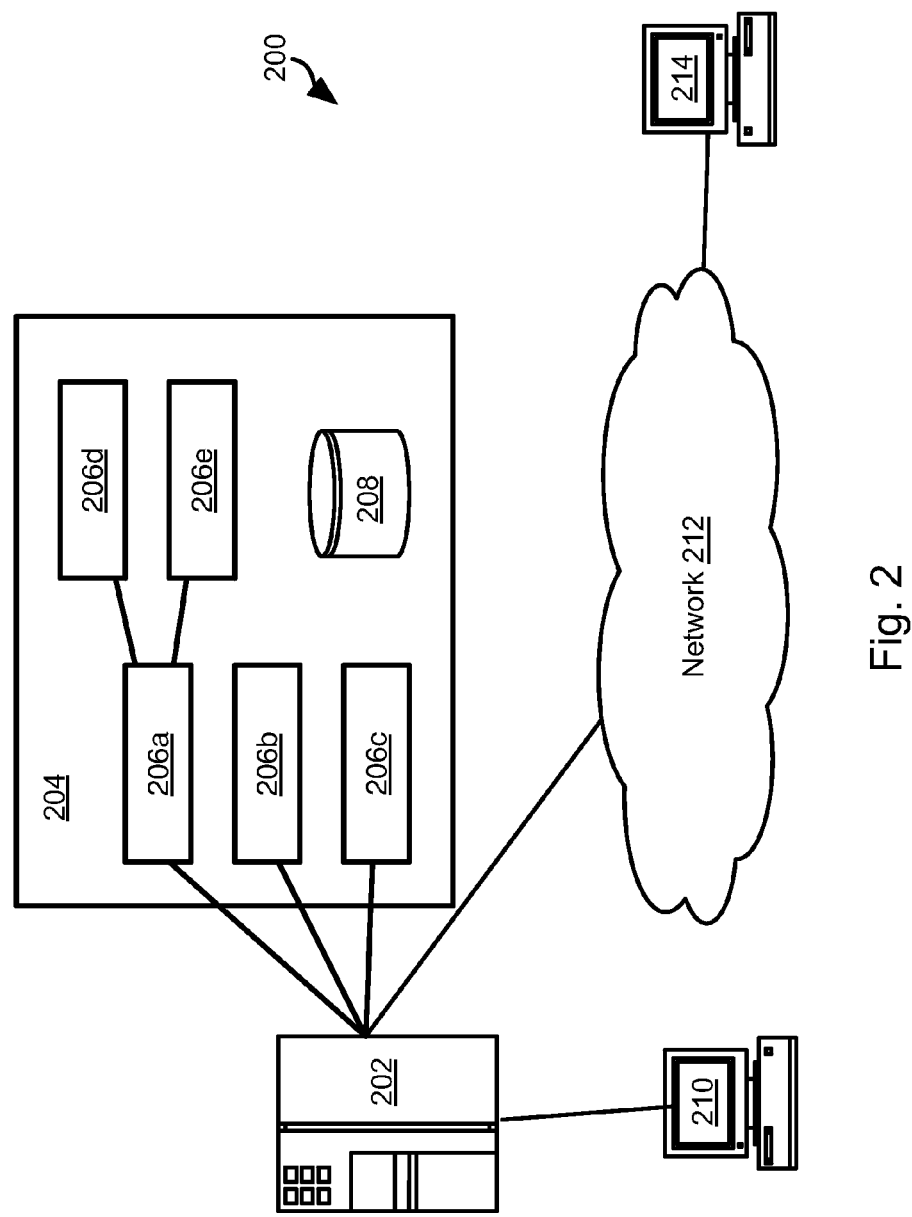
FIG. 2 is a block diagram of an environment suitable for implementing embodiments of the present invention.

FIG. 2 illustrates an example of a computing environment 200 suitable for implementing a map-update application. The computing environment may include one or more servers 202 and a worker node network 204. The worker node network 204 may include one or more worker nodes 206*a*-206*c*. A worker node 206*a* may also couple one or more other worker nodes 206*d*, 206*e* to the server 202 or to other worker nodes 206*a*-206*e*. The worker nodes 206*a*-206*e* may access a database 208 storing data resulting from operation of the map-update application. As discussed hereinbelow, the database 208 may include a persistent slate store.

A developer or administrator may access the server 202 and/or any worker node 206*a*-206*e* by means of a workstation 210, which may be embodied as a general purpose computer, tablet computer, smart phone, or the like. The server may be connected to a network 212 such as a local area network (LAN), wide area network (WAN), or the Internet. A user may also access data from the server 202, worker nodes 206*a*-206*e*, or database 208 by means of a user workstation 214. The user workstation may likewise be embodied as a general-purpose computer, tablet computer, smart phone or the like. Any of the devices of the computing environment 200 may include some or all of the components of the computing device 100.

Figure 3B:
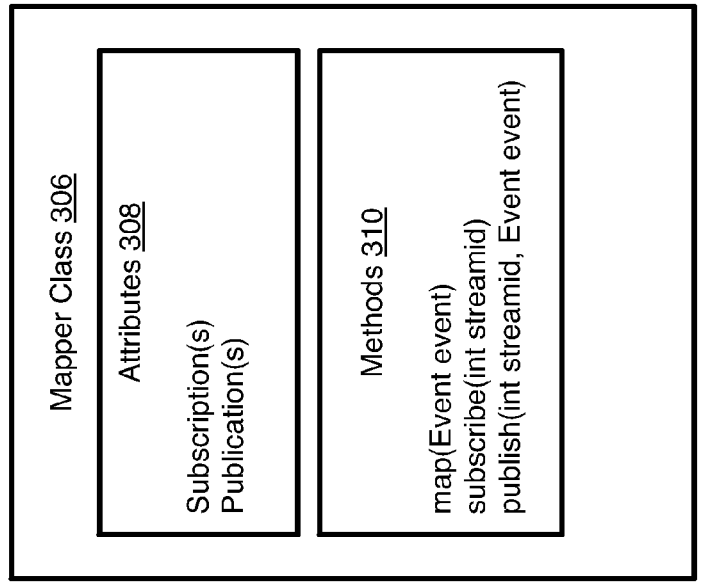
FIGS. 3A and 3B are schematic block diagram of map and update classes in accordance with an embodiment of the present invention.
Figure 3A:
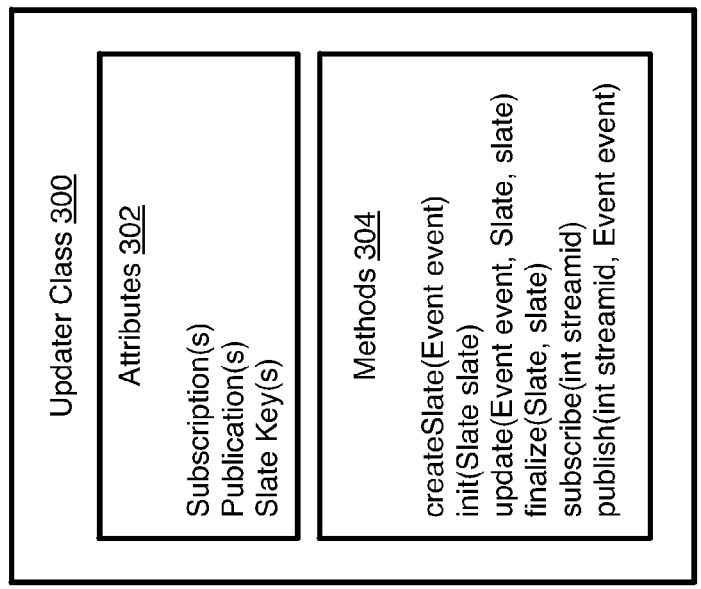

Referring to FIG. 3A, a map-update application may implemented including one or more instances of an updater class 300. An updater class 300 may include attributes 302 including subscriptions, publications, and at least one slate. A subscription may be an identifier of an input event stream. An event stream, such as an input event stream, may be embodied as key and value pairings having a common key. An event stream may be all events having the same key value. Accordingly, a subscription attribute may include one or more key values. In some embodiments an input event stream may include a grouping of events having different keys. Likewise, an output event stream may include a grouping of events having different keys A publication attribute may identify an output event stream for the updater class 300. In some applications some or all update functions do not publish events to an output event stream. As for the input event stream, an output event stream may be one or more events including key and value pairings. Accordingly, a publication attribute may include one or more key values used to identify the output streams for an instance of an updater class.

An instance of an updater class 300 may maintain a state from the processing of one event to the next. This state may be maintained using a slate. A slate may be any data structure and may be identified by a unique slate key. Accordingly, an updater class 300 may have as an attribute a slate key identifying a slate. A slate may store any type of data. For example, data stored in a slate may include any number of attribute and value pairings.

The updater class 300 may additionally define methods 304. For example, a method for creating a slate may be included. A slate creation method may take as an input an event. For example, upon receiving an event for which a corresponding slate does not exist, the updater may call the slate creation method and pass it the corresponding event. The slate creation method may then create a slate corresponding to that event. The slate may also be initialized according to an initialization (init( )) function that takes as an input a slate, such as, as identified using a slate identifier. The slate initialization function may be operable to create a slate object or otherwise define a slate within a memory.

The updater class 300 may additionally define one or more update methods. The update method may take as inputs an event and a slate, such as by means of a slate key. The update method performs an update on the slate in accordance with the method. A simple example is, for each event, embodied as key-value pairing, the update method may include, for a given event value, incrementing a counter corresponding to that value stored the slate. In this example, the slate may store an attribute-value pair including the event value as the attribute and the current state of the counter as the value. Any operation may be performed on a given event and any variable in a slate may be updated in response to the event as defined by a developer.

The methods 304 of the updater class 300 may additionally include a publication method to publish events to an output stream as defined using a publication attribute. The data published to an output stream may likewise include key and attribute pairings. In some embodiments, the data published may correspond to one or both of a currently processed event and a current state of the slate associated with an instance of the updater class 300. For example, using the counter example, the publication method may publish to an output stream a <key,value> event embodied as an <event value, counter state> pairing, wherein the "event value" is a possible value for an event on the input event stream and the counter state is the current value of the counter counting the number of occurrences of that value in the input event stream. Such an output event may be produced for each event, for each N events, or according to some other criteria. Other output events may be generated according to the needs of the developer according to any computation desired using one or both of input events and a state of the slate for the instance of the an updater class 300.

The updater class 300 may additionally define one or both of a subscription method allowing an instantiating function to define the input stream for an instance of the updater class. Other methods may include a finalize method for reporting on the final state of the slate for an instance of the updater class 300 and ending further updating of the slate. The slate may persist in a slate store following finalization. In some embodiments, a time to live (TTL) may be defined for an instance of an updater class 300 such that the instance will be finalized after a TTL period following one of instantiation of the instance or initiation of the slate according to the init( ) function.

FIG. 3B illustrate an example of a mapper class 306, that likewise includes attributes 308 and methods 310 to facilitate processing input event streams and publishing output event streams. The mapper class 306 may define subscription and publication attributes that function the same as for the updater class 300, that is they define one or more input event streams (e.g. input event key(s)) and one or more output event streams (e.g. output event key(s)).

The methods 310 may likewise include subscription and publication methods. The subscription method enables an instantiating or other function to define the input event stream(s) (e.g. input event key(s)) that will be processed by a given instance of the mapper class. A publication method may publish an output even on an output event stream defined according to the publication attribute. Instances of the mapper class 306 may perform stateless computations that do not depend on previous events. Accordingly, the publication method may publish an output event based only on an event being processed or immediately previously processed. The output event may be generated according to a map function defined in the methods 310. The mapping function may be any function desired by a developer. An example mapping function may include mapping the text of a particular tweet to a one or more concepts in a taxonomy as discussed in U.S. patent application Ser. No. 13/300,524, which is hereby incorporated herein by reference in its entirety. The '524 application additionally includes other examples of applications of a map-update application and methods for implementing such an application, which may be used in combination with any and all of the systems and methods disclosed herein.

Figure 4:
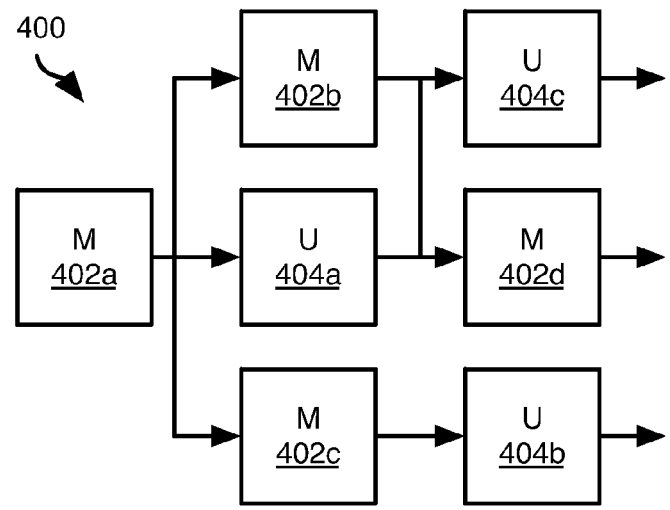
FIG. 4 is a schematic block diagram of a map-update network in accordance with an embodiment of the present invention.

FIG. 4 illustrates an example logical arrangement of mapper instances 402a-402d and updater instances 404a-404c. As shown a mapper 402a may publish events that are input to any number of other mappers 402b-402c or updaters 404a. These mappers 402b-402c and updaters 404a may then publish events to one or more other updaters 404b-404c or mappers 402d and so on. The arrangement of these instances may be determined by a developer to achieve a desired logical function. The illustrated arrangement may be a logical one. In some implementations each mapper or updater instance receives events from the event stream and publishes zero or more events to the event stream. However, the result of subscriptions and publications of each particular instance may result in a data flow hierarchy or network such as shown in FIG. 4.

Figure 5A:
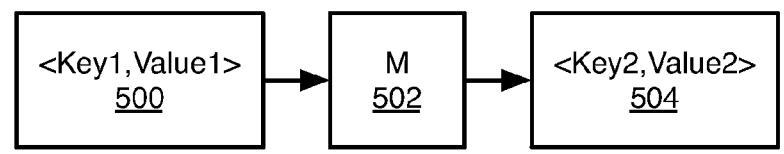
FIGS. 5A and 5B are schematic block diagrams of a map and update operations in accordance with an embodiment of the present invention.

FIG. 5A illustrates an example of operation of an instance of a mapper class or subclass. As shown, an input event 500 including a key and value pairing 500 is received by the mapper instance 502, which then outputs a second key and value pairing 504 that may have a different key than the first event 500. In some embodiments, a mapper may output zero, one, or multiple output event streams. Each output event stream may include published events having a key or a key from a group of keys associated with the output stream. As noted above, each event may also include a value. The output event may be the result of processing of the input event 500.

Figure 5B:
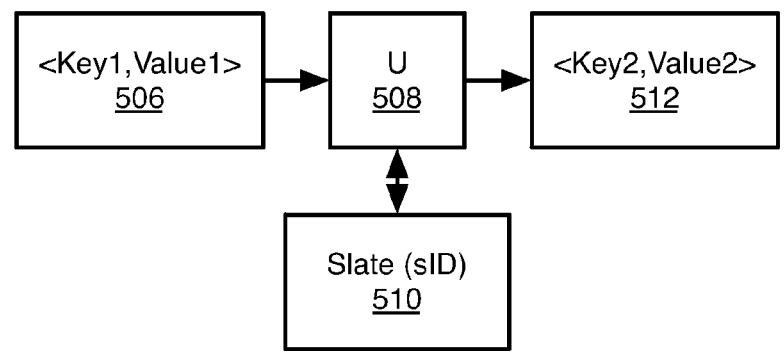

FIG. 5B illustrates an example of operation of an instance of an updater class. An input event 506 including a key and value pairing is input to an instance 508 of the updater class. The instance 508 performs an update operation taking as inputs a slate 510 and the event 506. The update operation modifies the slate 510 which may be written to a cache or persistent slate store. The update operation publishes zero or more events 512 each including a key and value pairing, where the key is typically different from the key for the first event. In some embodiments, an updater may output zero, one, or multiple output event streams. Each output event stream may include published events having a key or a key from a group of keys associated with the output stream. As noted above, each event may also include a value.

Figure 6:
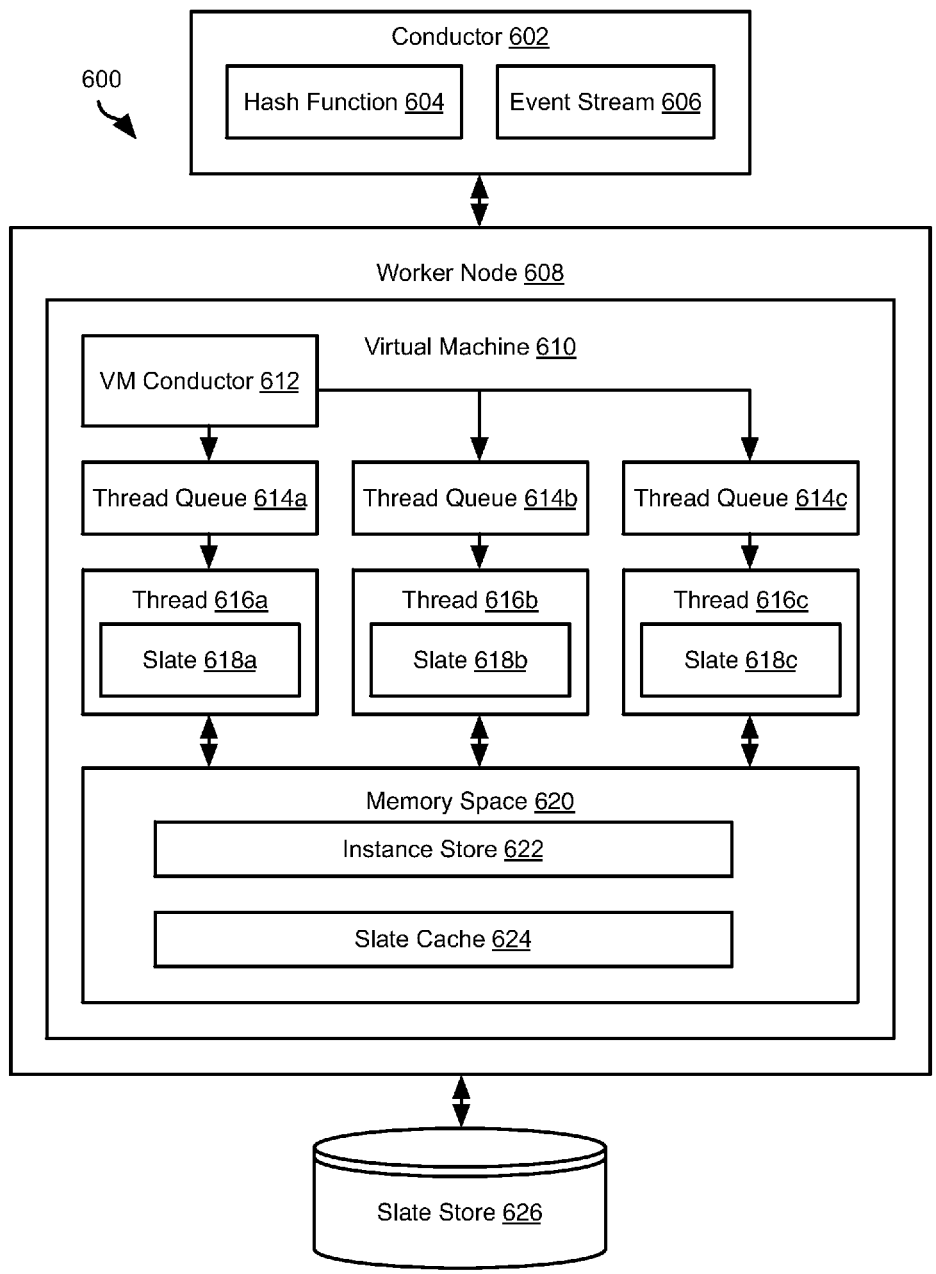
FIG. 6 is a schematic block diagram of an architecture for implementing a map-update application in accordance with an embodiment of the present invention.

FIG. 6 illustrates architecture 600 for implementing a map-update application. The architecture 600 may include a global conductor 602 for routing events to various worker nodes. The global conductor 602 may implement a hash function 604 or hash table that maps events to one or more instances of mapper or updater classes. The hash function 604 may map a key from a key-value pairing of an event to a particular instance. Accordingly, subscribing by an instance to an event may include causing modification of the hash function 604 to map an event to the instance. The conductor 602 may also implement or access an event stream 606 that includes events from external sources as well as events output from instances of mapper or updater classes.

One or more worker nodes 608 may be in data communication with the conductor 602. The global conductor 602 may be hosted on a server that is distinct from any of the worker nodes 608 or may be hosted on one or more worker nodes 608. A worker node may host a virtual machine 610, such as a Java Virtual Machine (JVM). The virtual machine 610 may implement a virtual machine (VM) conductor 612. The VM conductor 612 may be programmed to route events received at the node 608 to one or more threads. This may be accomplished by means of a hash function that maps events to particular instances and a particular event and instance to one or more threads, as will be discussed in greater detail below. An event may be mapped to multiple instances of mapper or updater classes. Accordingly, a mapping of an event may include mapping the event to both a thread and a specific instance.

In some embodiments, the global conductor 602 maps events to a particular node 608 whereas the VM conductor 612 maps events to particular target instances. In some embodiments, the global conductor 602 may also map an event to a target instance.

The VM 610 may implement thread queues 614a-614c each associated with a thread 616a-616c. A queue 614a-614c may be embodied as a first-in-first-out queue. The entries in the queues 614a-614c may include an event and instance pairing as assigned by one or both of the VM conductor 612 and the global conductor 602.

A thread 616a-616b may have a slate 618a-618c associated therewith. The slate 618a-618c may correspond to an update instance that is currently processing or recently concluded processing of an event in the thread 616a-616b. In cases where a mapper instance is processing an event in a thread 616a-616c, the thread may not have a slate 618a-618c associated therewith. Associating a slate 618a-618c with a thread may include associating a lock on the slate 618a-618c indicating only that the thread is the only thread that may modify or access the slate 618a-618c.

The threads 616a-616c may access a common memory space 620 associated with the VM 610. The memory space 620 may include an instance store 622 that stores instances of mapper and updater classes and may store corresponding class definitions. A thread 616a-616c may retrieve an instance from the instance store 622 to process an event from a corresponding thread queue 614a-614c.

The memory space 620 may additionally include a slate cache 624 that stores slates that are being used, were previously used, or are likely to be used by a thread 616a-616c. A persistent copy of slates may be stored in a slate store 626 that may be accessed by one or more worker nodes 608. Cache consistency may be maintained between the slate caches 624 of the one or more worker nodes 608 and the persistent slate store 626.

Figure 7:
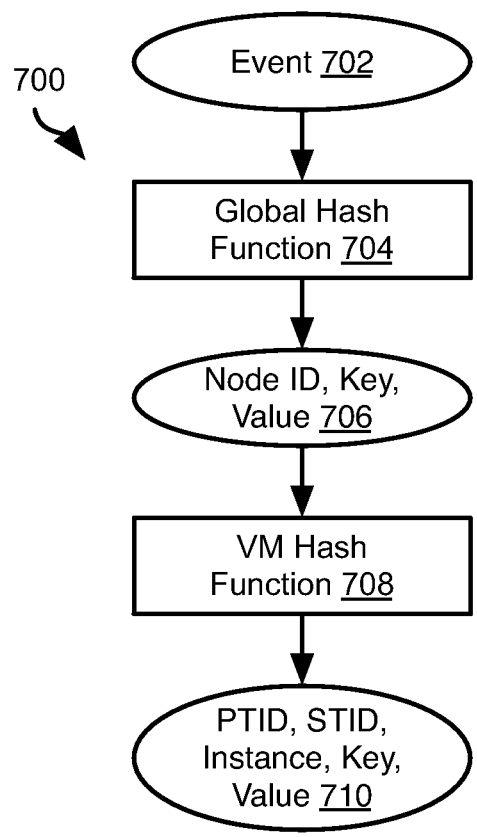
FIG. 7 is process flow diagram illustrating event assignment in a map-update architecture in accordance with an embodiment of the present invention.

FIG. 7 illustrates an example of data flow within the VM 610. An event 702 may be processed according to a global hash function 704, which produces an output 706 that may include a node identifier for a worker node 608 and the event, embodied as a key and value pairing. The output 706 may also identify a target instance (mapper or updater) for the event. The output 706 may be provided to the VM hash function 708 of the identified node, which produces an output 710 including one or more of a primary thread identifier (PTID), secondary thread identifier (STID), an instance identifier, as well as the event, embodied as a key and value pairing. In some embodiments, only a single thread identifier is output instead of both primary and secondary thread identifiers. In other embodiments, three or more thread identifiers may be output.

FIG. 8 illustrates a method 800 for assigning to a thread the processing of an event using a specified instance. The method 800 may include receiving 802 an event assignment. As noted above, an event assignment may identify a target instance and a primary thread and secondary thread. The target instance may be evaluated 804. The method 800 may include determining 806 whether one of the primary and secondary threads identified in the assignment is a hot spot for the target instance. This may include evaluating 806 whether either of the primary and secondary threads is currently processing an event for the target instance. If so, this thread may be deemed a hotspot. In some embodiments, a thread is deemed a hotspot if N of the previous M events processed were processed using the target instance. Other evaluations of prior processing of a thread may also be used to determine whether the thread is a hotspot for a target instance. Hotspot detection may be particularly helpful to avoid "slate contention" wherein one thread is waiting for access to a slate while another thread completes processing. Accordingly, in some embodiments, the method 800 may be used to assign events to threads only where the target instance is an instance of an updater class, whereas events with a target instance corresponding to a mapper class may be assigned in a different manner, such as using simple load balancing.

If one of the primary or secondary threads is found 806 to be a hotspot for the target instance for an event, processing of the event in the target instance may be assigned 808 to whichever thread is found 806 to be the hotspot. If it is not found 806 that either of the primary and secondary threads is a hotspot, then the thread queues for the primary and secondary thread may be evaluated 810. If the size of the thread queue for the primary thread is found 812 to be above a specified threshold, or a threshold amount above the size of the secondary queue, then processing of the received event in the target instance may be added 814 to the queue of the secondary thread. Otherwise, processing of the event using the target instance thereof may be added 816 to the queue of the primary thread.

In some embodiments, an event and corresponding target instance may be added to the primary queue unless the size of the primary queue is a certain multiple of the size of the secondary queue, such as 110 percent, 120 percent, or some other multiple of the size of the secondary queue.

The method 800 may be operable to balance competing interests within the VM 610. In order to take advantage of as many processing cores as possible, it is advantageous to perform some sort of load balancing among available threads. However, in order to avoid slate contention, it is advantageous to assign all event processing in a target instance to the same thread, particularly for instances of updater classes. Having a primary and secondary thread for each target instance with a bias toward assigning events for the target instance to the primary thread provides means for balancing these interests. The threshold at which events are assigned to the secondary thread may be used to adjust the bias toward the primary thread in order to balance these competing interests. The step of evaluating 806 which of the threads is a hotspot further facilitates the avoidance of slate contention.

Another concern is reducing the computation required in assigning processing of an event in a target instance to a particular thread. As the number of cores in computer systems increase, evaluating queues of all available threads adds undue computational load. Accordingly, in some embodiments, for each target instance only a primary and a secondary thread are assignable, thereby reducing the amount of processing needed in thread assignment.

Figure 9A:
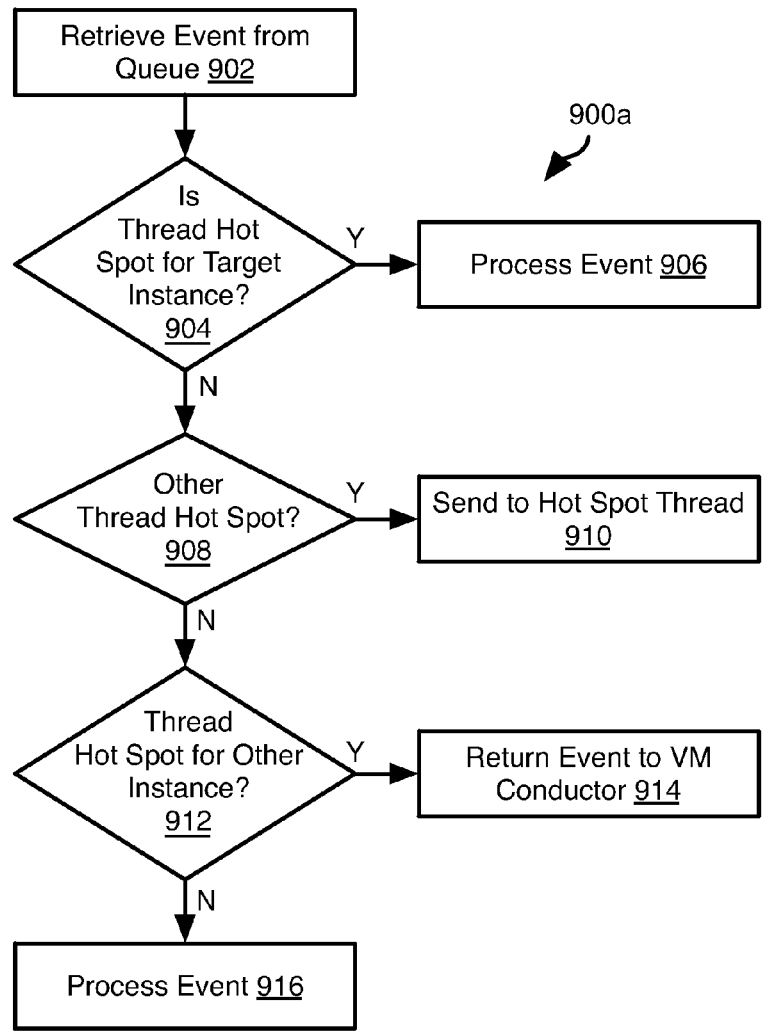
FIGS. 9A and 9B are process flow diagram of methods for processing events with awareness of hotspots in accordance with an embodiment of the present invention.

FIG. 9A illustrates a method 900a for processing events from a thread queue. The method 900 may be executed by a thread 616a-616c or some other module of the VM 610. As already noted, a thread queue may store both an event and an identifier for a target instance for processing the event as assigned by one or both of a global conductor 602 and VM conductor 612.

The method 900a may include retrieving 902 an event and corresponding target instance from the thread queue for a thread. The method 900a may include evaluating 904 whether the thread is a hotspot for the target instance for the event. If so, then the event may be processed 906 using the target instance in the thread. Evaluating 904 whether the thread is a hotspot may include evaluating whether the thread is currently processing an event or the same target instance or otherwise has a lock on a slate for the target instance. Evaluating 904 whether the thread is a hotspot may include evaluating whether the thread already has the slate loaded or otherwise is the thread with current access to the slate to a greater extent than the other of the pair of primary and secondary threads for the target instance.

As noted above, the method 900a may be executed for a thread queue corresponding to a thread. If the thread is not found 904 to be a hotspot for the target instance of an event, the method 900a may include evaluating 908 whether the other thread of the primary-secondary thread pair for the target instance is a hot spot. This may include evaluating 908 any of the criteria discussed hereinabove for determining whether a thread is a hotspot for a target instance. If so, then the event may be sent 910 to this hotspot thread. This may include adding the event to the thread queue for the hotspot thread. The event may be added at the end of the queue or at the beginning. The methods disclosed herein are particularly applicable to processing of data streams where ordering of processing of events is not critical. Accordingly, where the event is added to the queue for the hotspot thread may be unimportant.

If the neither of the primary and secondary threads is found 904, 908 to be a hotspot for the target instance of an event, the method 900a may include evaluating 912 whether the thread corresponding to the queue from which an event was retrieved 902 is actually a hotspot for a different target instance than the target instance for the event. If so, then the event may be one of returned 914 to the VM conductor for assignment to another thread according to the methods described herein or transferred to the other thread of the primary-secondary thread pair to which the thread corresponding to the queue belongs. If the thread corresponding to the queue is not found 912 to be hotspot for another target instance, then the event retrieved 902 may be processed 916 using the specified target instance for the event.

Figure 9B:
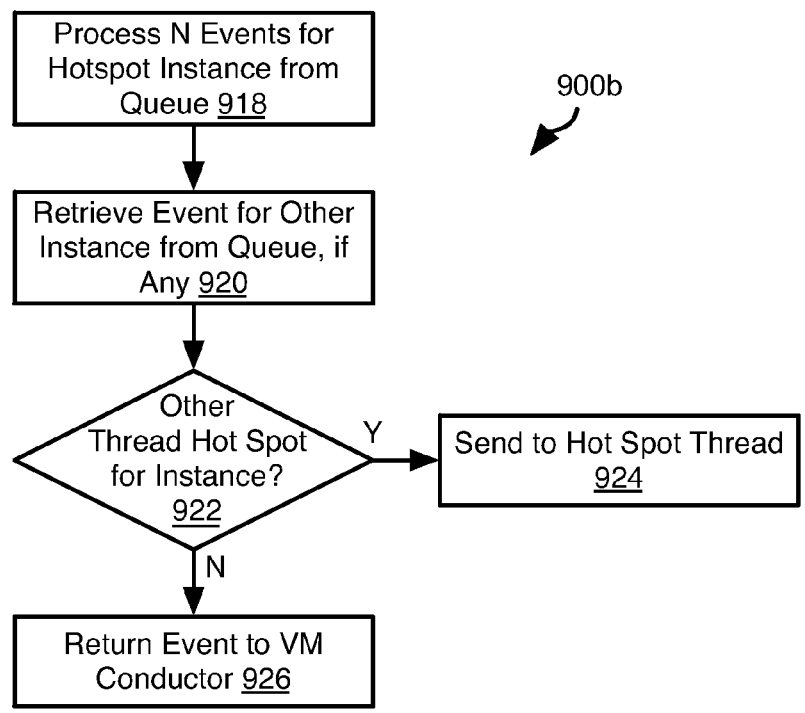

FIG. 9B illustrates an alternative method 900b for processing events from a thread queue. The method 900b may be executed following detecting a thread to be a hotspot for a target instance. This may include evaluating whether specified number N of the last M events processed were processed in a target instance. Other methods may also be used, such as if N consecutive events are for the same target instance, the thread may be flagged as a hotspot for that instance. A thread may be deemed a hotspot for an instance simply because the thread is currently processing an event in the instance or the immediately preceding event before retrieving the next event from an event queue was processed in the instance. Various other methods may also be used depending on the needs of the developer.

Accordingly, the method 900b may include processing 918, from the queue for a thread, a specified number N of events corresponding to the instance for which the thread is a hotspot. This may include processing N events corresponding to the hotspot instance regardless of the presence of events for other target instances. After processing 918 N events, the queue may be evaluated and one or more events for instances other than the hotspot instance may be retrieved 920 and evaluated 922. If an event for a target instances other than the hotspot instance are for a target instance for which another thread is a hotspot, the event may be sent 924 to that thread. Otherwise, the event may be sent 926 to the VM conductor 612 for assignment to a different thread or otherwise transferred to the queue of the other thread of the primary-secondary thread pair for the target instance of the event. In some embodiment, if a thread is a hotspot for a target instance, events for other target instances are all sent to the VM conductor 612 for assignment to a different thread.

The method 900b may advantageously prioritize processing of events for instances for which the thread is a hotspot. By processing N events for the hotspot instance before checking for events for other target instances, processing of events for the hotspot instances will be processed more quickly without overhead from processing other events for other target instances.

Figure 10A:
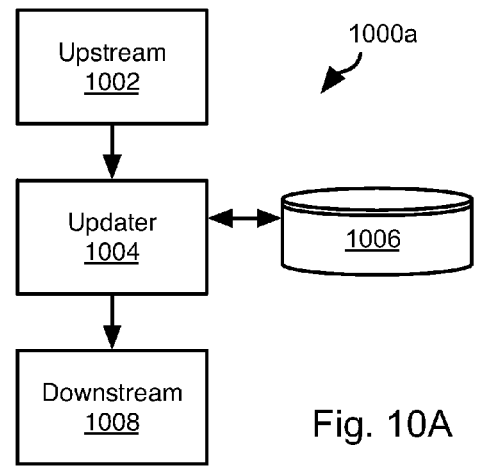
FIGS. 10A and 10B illustrate data structures for splitting an event queue in accordance with an embodiment of the present invention.
Figure 10B:
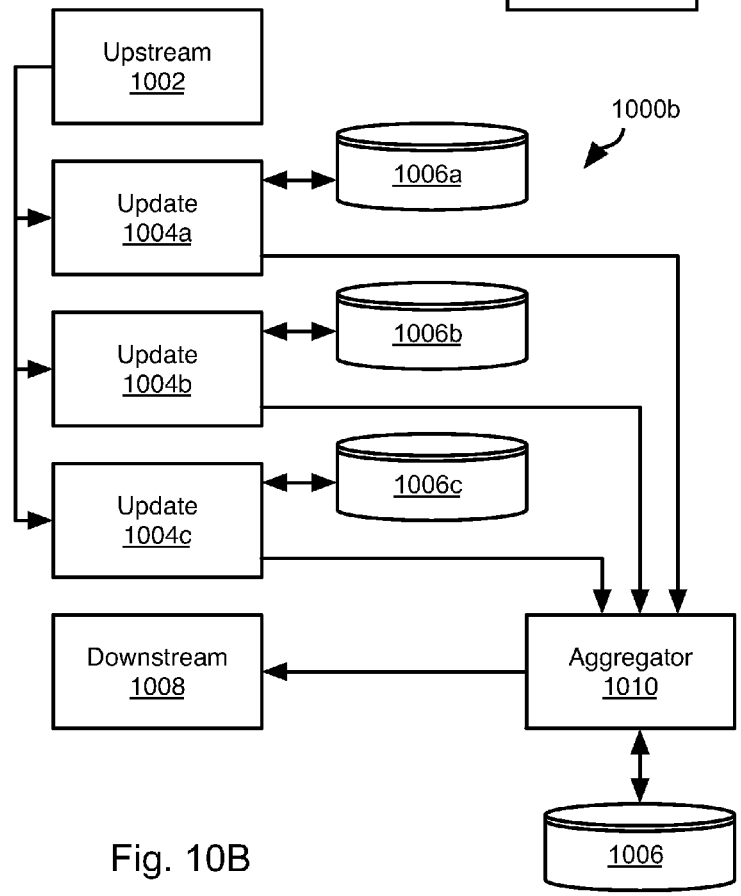

FIGS. 10A and 10B illustrate a method for dealing with overloading of a target instance with events. In particular, a method for dealing with overloading of an instance of an updater class with events.

In a first configuration 1000a, one or more upstream event sources 1002, such as other mapper or updater instances or external publishers of events, provide events to an updater instance 1004 having a slate 1006 associated therewith. The updater instance 1004 may publish one or more events processed by one or more downstream instances 1008, such as other mapper or updater instances.

Upon detecting overloading of the updater instance 1004, the first configuration may be modified to obtain the configuration 1000b of FIG. 10B. In the configuration 100b, events from the upstream event sources 1002 are distributed among two or more partial updater instances 1004a-1004c each having a corresponding partial slate 1006a-1006c associated therewith. Distributing the events among the partial updater instances 1004a-1004c may advantageously allow for processing of events in multiple threads thereby allowing target instances with large event loads to be adaptively assigned more computing resources in order to achieve low latency.

Each of the partial updater instances 1004a-1004c performs a partial update on the partial slates 1006a-1006c according to events received. The update function performed by the partial updater instances 1004a-1004c may be the same as, or different from, the update function performed by the updater instance 1004. The partial updater instances 1004a-1004c may periodically publish events reflecting the state of the partial slates 1006a-1006c.

The events published from the partial updater instances 1004a-1004c may be received by an aggregator instance 1010 that processes the events published by the partial updater instances 1004a-1004c in order to update the slate 1006. The aggregator instance 1010 may publish events to the downstream instances 1008. The events published by the aggregator instance 1010 may reflect the state of the slate 1006.

Figure 11A:
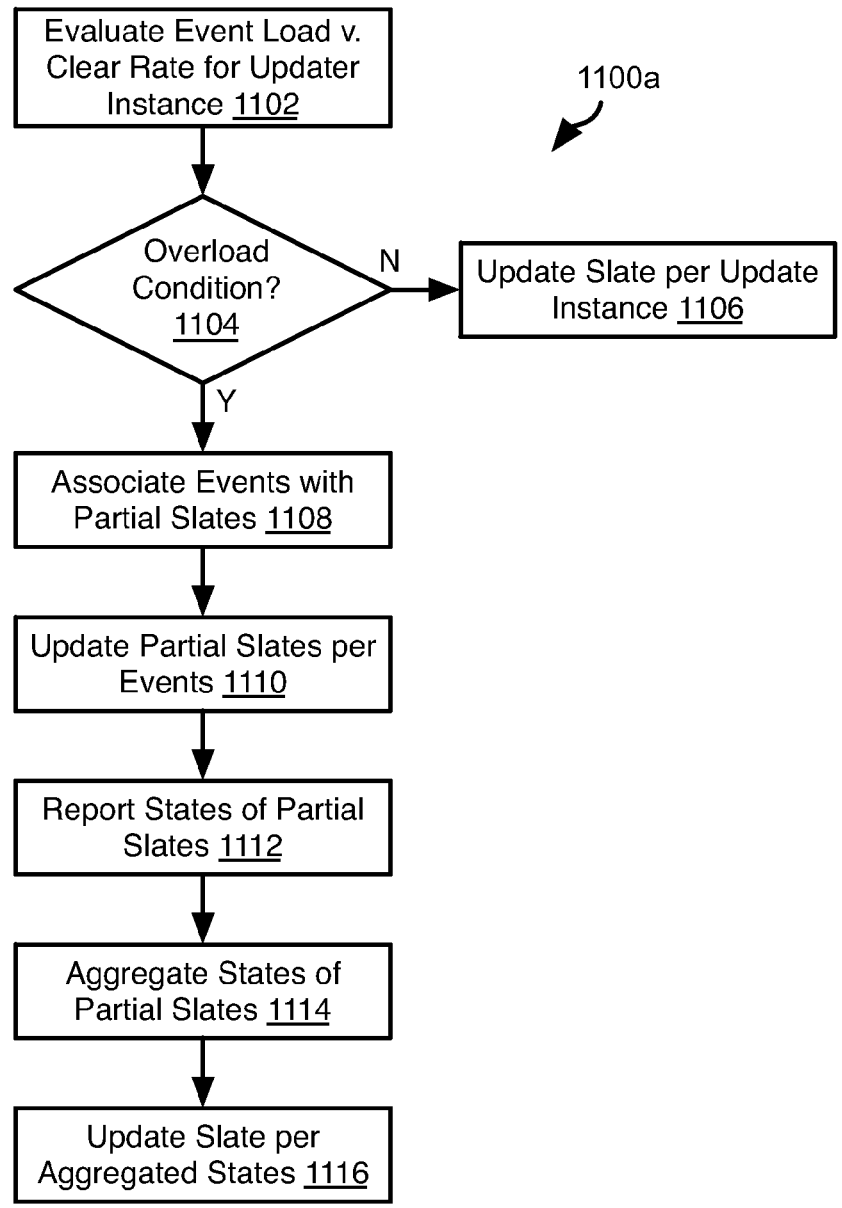
FIGS. 11A and 11B are process flow diagrams of methods for splitting and consolidating event queues in accordance with an embodiment of the present invention.
Figure 11B:
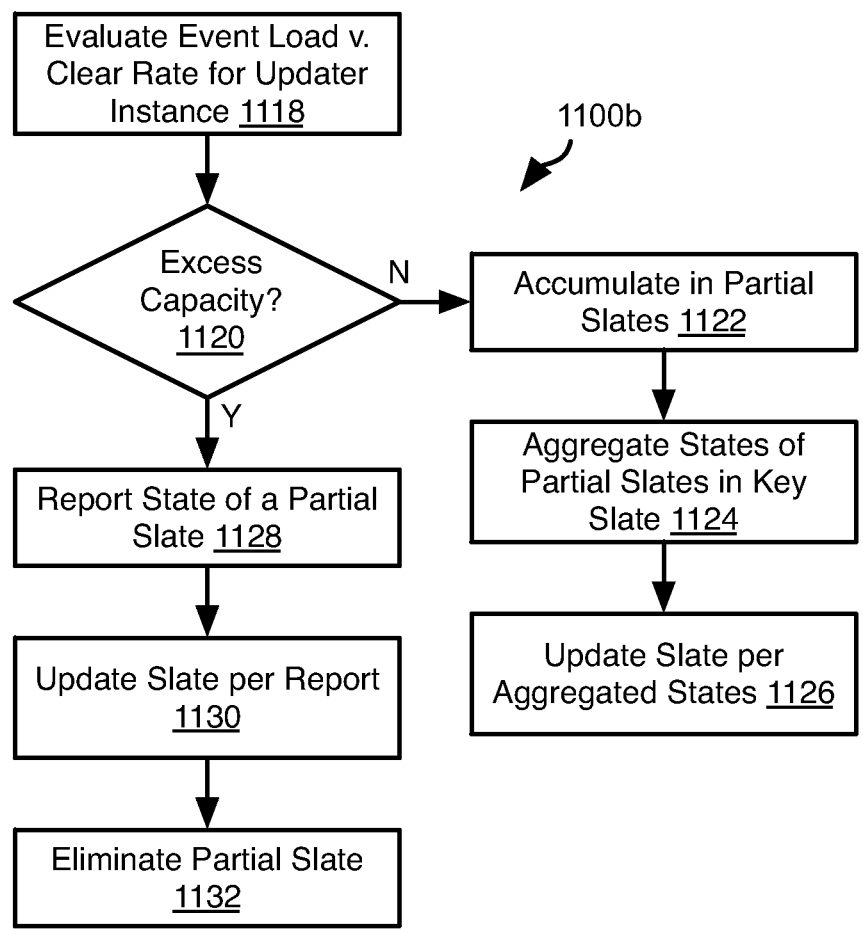

FIGS. 11A and 11B illustrate examples of methods 1100a-1100b for adaptively configuring partial updater instances in response to overloading of an updater instance. The condition that constitutes overloading may be determined by a developer. An example of an overload condition may include the condition where events are being added to a thread queue faster than they are being processed. Alternative or additionally an overload condition may include a thread queue exceeding a specified size. Where the thread is a hotspot for a target instance, the overload condition may be evaluated with respect to events for the hotspot target instance.

Referring to FIG. 11A, a method 1100a may include evaluating 1102 an event load versus a clear rate for a particular update instance. The clear rate may be the rate at which events are retrieved from the queue and processed. If the evaluation 1102 is found 1104 to not indicate an overload condition, then the event may be processed 1106 and slate updated in a corresponding update instance according to methods disclosed herein.

If an overload condition is found 1104 to exist, then events may be associated 1108 with two or more partial slates. The number of partial slates may correspond to the degree of overloading of the update instance. The partial slates may then be updated 1110 according to the events distributed thereto, such as by performing an update function on the partial slate according to one or both of a received event and the current slate of the partial slate.

The state of the partial slates may be periodically reported 1112 such as by publishing events to one or more output streams. The reported states of the partial slates may be aggregated 1114. As an example, aggregating of the partial states may be performed in any manner suitable for a developer. For example, using the counter example, where the update operation updates a counter, the values for a partial count may be maintained in the partial slates and then summed by the aggregator to obtain a final count. In a more general case the partial states may report any attribute and value pairing. Events published reporting the states of the partial slates may include a similar attribute and value pairing. Events from different partial slates with the same attribute may have their values aggregated as defined by a developer, which may include any arbitrary function.

A slate may be updated 1116 according to the aggregation of the reported states of the partial slates. In some embodiments, the slate is the slate associated with the original updater instance before division of the updater function into partial updater instances and an aggregator instance.

The illustrated method 1100a may also be used for adding additional partial slates in cases where an overload condition is detected after events have already been associated with two or more other partial slates in response to a previously detected overload condition.

FIG. 11B illustrates a method 1100b for consolidating partial updaters according to event loading. The method 1100b may include evaluating 1118 event load versus clear rate for an updater instance. If an excess capacity is not found, then processing may continue as described with respect to 1100a, which may include processing events and accumulating 1122 results of processing in partial slates, aggregating 1124 the states of the partial slates, and then updating 1126 a slate according to the aggregated states of the partial slates.

If an excess capacity is found 1120 to be present, then the method 1100b may include reporting 1128 a final state of at least one partial slate, updating 1130 a slate according to the reported partial slate, and then eliminating 1132 the partial slate. This may include ceasing to distribute events for updating to the partial slate. If all partial slates are eliminated but one, the state of the last partial slate may be reported and used to update the slate and processing may revert to updating a single slate using a single updater instance according to the methods described hereinabove.

Figure 12A:
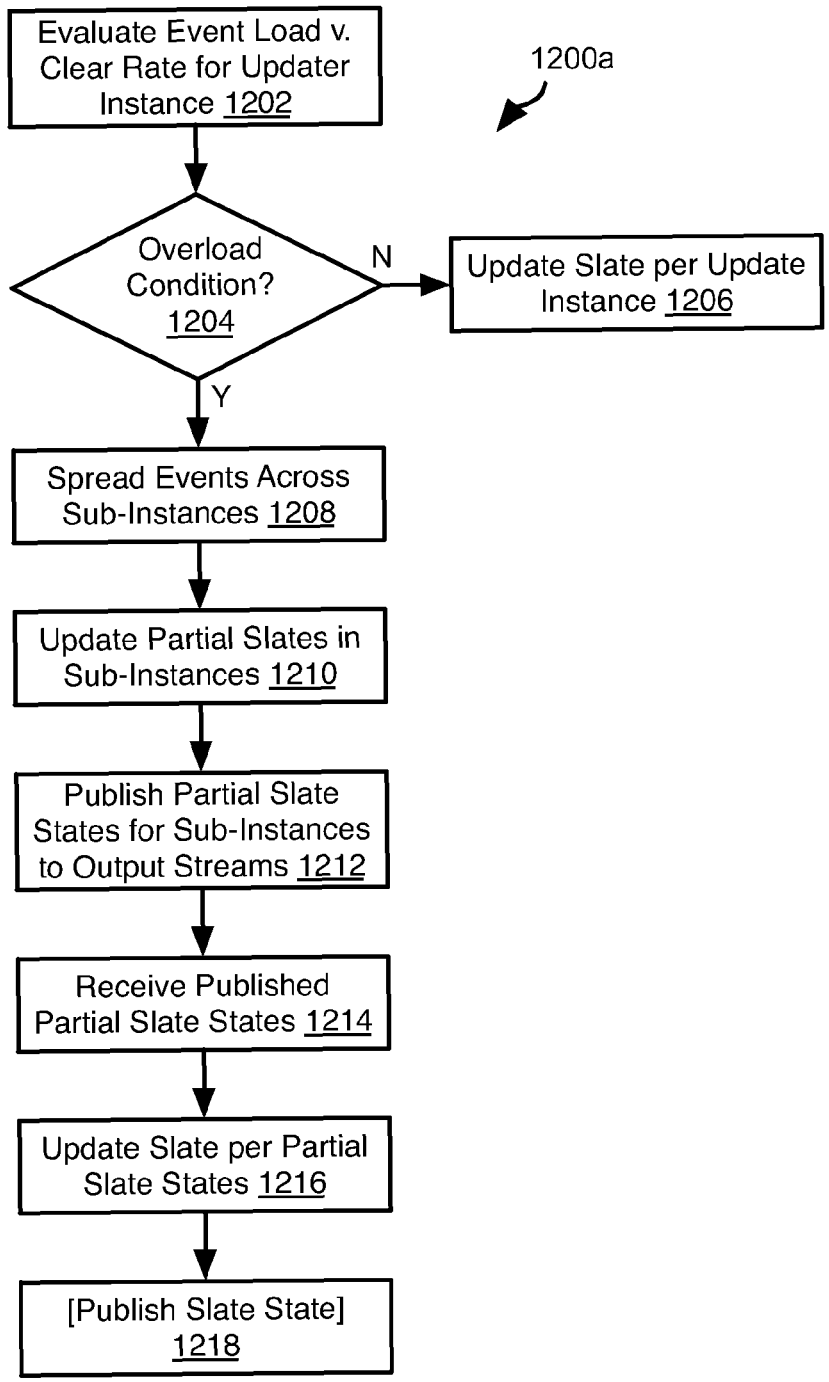
FIGS. 12A and 12B illustrate alternative methods for splitting and consolidating event queues in accordance with an embodiment of the present invention.
Figure 12B:
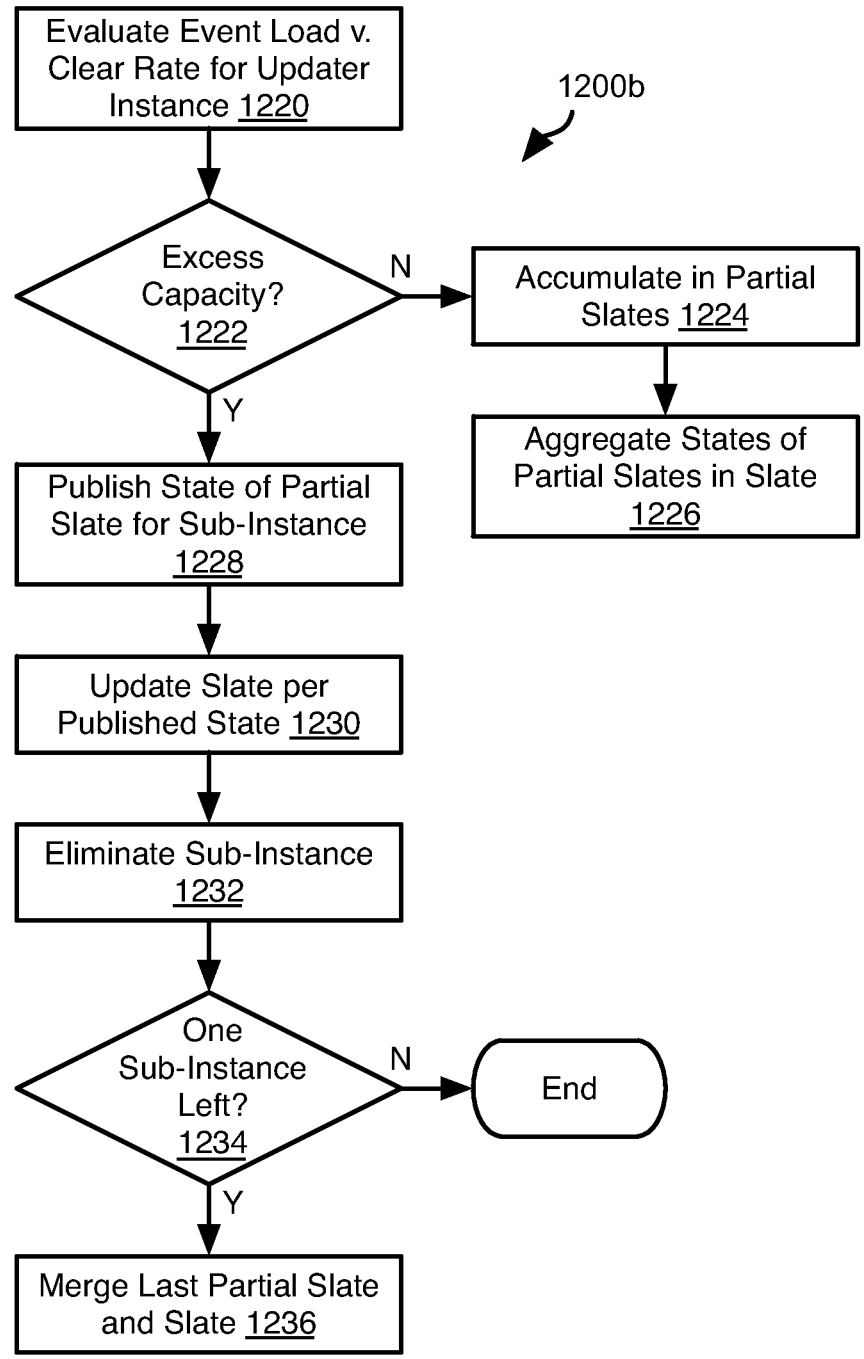

FIGS. 12A-12C illustrate alternative methods for dealing with overloaded updater instances. Referring to FIG. 12A, a method 1200a may include evaluating 1202 an event load versus a clear rate for an updater instance, such as performing the analysis of loading described hereinabove in connection with the method 1100a. If an overload condition is found 1204 not to exist, then events may be processed and a slate updated 1206 according to an original updater instance according to the methods described herein.

If an overload condition is found 1204 to exist, then sub-instances of the overloaded updater may be instantiated. The sub-instances may be based on an identical class definition or a similar but different definition for sub-instance-type updaters. Events originally assigned to the overloaded updater may then be spread 1208 to the sub-instances. In some embodiments, the VM conductor 612 may be modified, such as by modifying a hash function, to distribute events among the sub-instances in a round-robin or other distribution scheme.

The sub-instances may also be initialized to subscribe to a same input stream as the overloaded updater. The subscription scheme for the sub-instances may be different from that outlined above inasmuch as each event in the input event stream will not be passed to each sub-instance. Instead, each sub-instance will receive a portion of the events received on the original input stream of the overloaded updater instance. In an alternative embodiment, new event streams may be created and events for the original input event stream for the overloaded updater instance may then be distributed to these new event streams by the VM conductor. The sub-instances may be initialized to subscribe to these new event streams.

Each of the instantiated sub-instances may have a slate associated therewith that may be considered a partial slate inasmuch as each sub-instance only receives part of the events for the original input event stream of the overloaded updater instance. Accordingly, for each event received by a sub-instance, the partial slate may be updated 1210 according to the event and the current state of the partial slate according to the methods described herein. The sub-instances may then periodically publish 1212 the state of the slate to an output event stream. Inasmuch as the sub-instances are advantageously used to reduce loading of a single updater instance, the published 1212 state of the slate may be output less frequently than input events. For example, the state of the slate for a sub-instance may be published after every N events processed, where N is two or more events.

An aggregator instance may receive 1214 the events published on the output event streams of the sub-instances. As discussed above, this may be accomplished by subscribing the aggregator to the output streams of the sub-instances. In some embodiments, a developer may define for an updater class an aggregation function to be used in instances where the functionality of an updater is distributed among sub-instances. Accordingly, an aggregator may be an instance of an updater class performing updates according to an aggregator function. Likewise a developer may also define for an updater class a partial-updater function to be used to update a partial slate in cases where the functionality of an updater class is distributed among sub-instances. In still other embodiments, a default aggregator instance may be instantiated that performs a generic aggregation of the output streams of the sub-instances.

The aggregator instance of any of the foregoing embodiments may update 1216 an aggregate slate according to the received partial slate states received from the sub-instances. The aggregate slate may be the original slate for the overloaded updater instance prior to instantiation of the sub-instances as further updated according to published partial slate states received from the sub-instances. Where the overloaded function was operable to publish the slate state to an output stream, the state of the aggregate slate may be published 1218.

The illustrated method 1200a may also be used for adding sub-instances in cases where an overload condition is detected after two or more sub-instances have already been created in response to a previously detected overload condition.

Referring to FIG. 12B, the illustrated method 1200b may be used to consolidate sub-instances in the event of excess capacity. The method 1200b may include evaluating 1220 an event load versus clear rate for an updater instance as discussed hereinabove. If an excess capacity is not found 1220, then processing may continue as described above with respect to the method 1200a for multiple partial instances. This may include accumulating 1224 updates to partial slates and aggregating 1226 published slate states for the partial slates in an aggregate slate or original slate as described hereinabove.

If an excess capacity is found 1222, then a sub-instance may be selected and the state of a partial slate corresponding thereto may be published 1228 and an aggregate slate updated 1230 according to the published state. The VM conductor 612 may then be eliminated 1232. This may include modifying the VM conductor 612 to no longer route events to the eliminated sub-instance and otherwise deleting the eliminated sub-instance and its partial slate from memory.

If it is found 1234 that more than one sub-instance is left, the method 1200c may end. If only one sub-instance is left, then the method 1200b may include merging 1236 the partial slate of the sub-instance with the aggregate slate and otherwise eliminating the sub-instance. The operation of the original single updater instance may be restored including the receiving of events and updating the aggregate slate according as described hereinabove. In some embodiments, the partial slate may be merged with the aggregate slate and the sub-instance may commence operation as the original updater instance and update the aggregate slate directly as an updater according to functionality described hereinabove.

The methods described hereinabove with respect to FIGS. 10A through 12B have been described primarily with respect to updaters. However mapper instances may also be subject to division into sub-instances upon detecting overloading of an instance.

Figure 13:
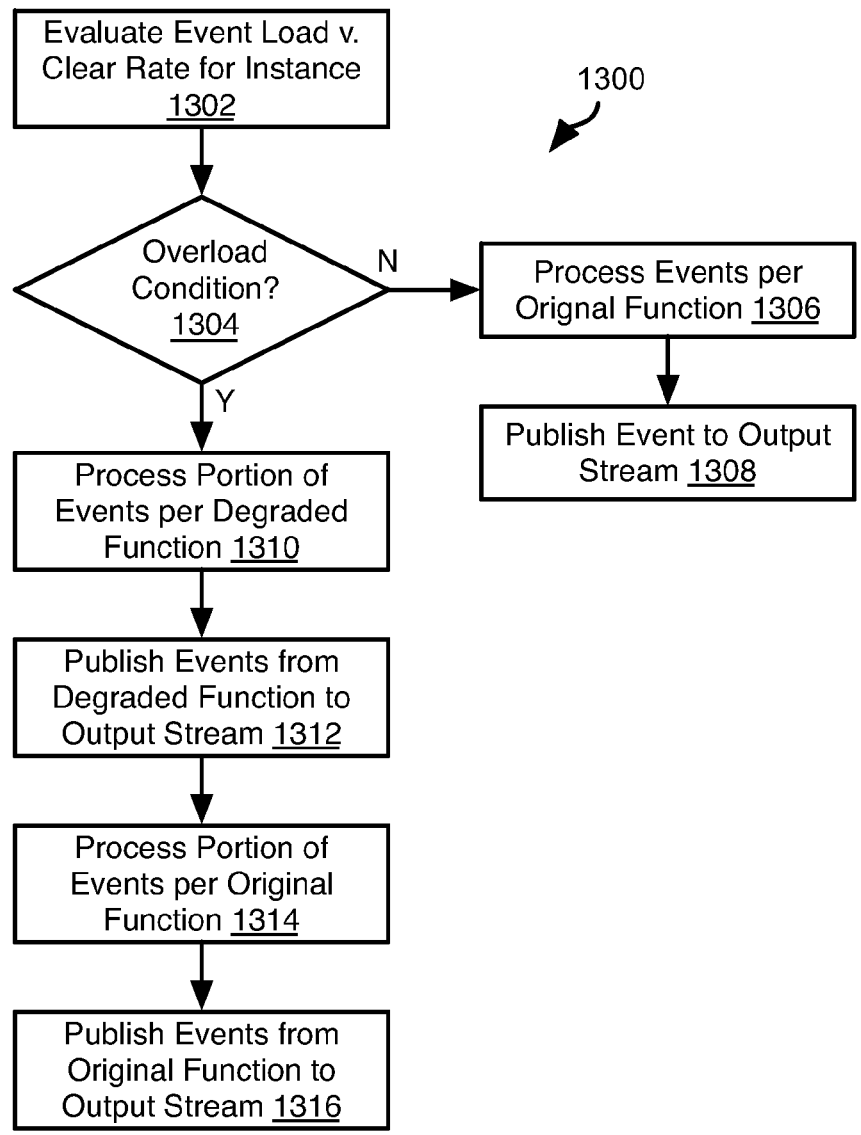
FIG. 13 is a process flow diagram of a method for selectively processing events according to a degraded function to reduce overloading in accordance with an embodiment of the present invention.

FIG. 13 illustrates a method 1300 for dealing with overloading in a different manner. In some applications, it may be better to process events in a less accurate or less effective manner rather than to fail to process some events altogether. Accordingly, a method 1300 may include evaluating 1302 loading of an instance, which may be a mapper or an updater instance, such as according to methods described hereinabove for detecting overloading of an instance. If an overload condition is found 1304 not to exist, than events may be processed 1306 according to an original function, whether a mapping or an update function. Events may also be published 1308 to an original output stream as defined by an original publication function.

If an overload condition is found 1304 to exist, then the method 1300 may include processing 1310 a portion of events for the target instance according to a degraded function and publishing 1312 events from the degraded function to the same output stream of the target instance. The method 1300 may additionally include processing 1314 a portion of events for the target instance according to an original function and publishing 1316 events to the output stream of the target instance. In some embodiments, the degraded function may publish events to zero or more different output streams than the original function, depending on the preferences of a developer.

The portion of events in the input stream or streams of a target instance that are processed according to the degraded and original functions may be defined by a developer and may be defined according to a function of loading of the target instance. The degraded function typically requires less time to complete and may additionally require fewer computing resources such as memory and network access. In some embodiments, the degraded function may simply be a bypass that receives events from an input stream and publishes them to an output stream. In either case, the events processed using the degraded function are not lost and further processing on the output stream of the target instance will include the influence of events processed using both types of functions.

In some embodiments, the original function may require network access that requires time to complete whereas this access is omitted in the degraded function. For example, an event embodied as a tweet may include a hyperlink that should be accessed to determine the subject matter or concepts associated with the tweet. In contrast a degraded function may evaluate only the text of the tweet with respect to a taxonomy to determine one or more associated concepts. The original and degraded functions may both be defined by a class definition for a target instance and functionality of the VM 610 may determine which function to invoke, and how to divide events between the two functions, according to loading of threads in the VM 610. In some embodiments, multiple versions of a degraded function may be defined and invoked according to loading.

In some embodiments, the degraded function may be defined recursively. For example, an overloaded instance with original function f may have a degraded function g that also overloads. In this case, the events to g faced with imminent discard may be configured to be routed to a degraded stream s' that is subscribed by a degraded-function h for g. In this circumstance, the event is still protected from discard and processed by h. Additional levels of degraded functions may also be defined for a function of f of an instance.

Various methods to deal with overloading are disclosed herein, in addition to use of a degraded function to reduce overloading of an instance. In some embodiments, an upstream instance may be slowed down in order to prevent overloading of a downstream instance. In such an approach, events may be lost due to slowing of the upstream instance. In other embodiments, events are buffered to prevent loss. Which instances are such that dropping events is preferred to overloading a downstream event may be specified by a developer or determined by the VM 610. For example, a developer may specify a priority for an instance such that an upstream instance of lower priority is required to slow and fail to process events in order to avoid overloading the higher priority downstream instance.

Figures 14A, 14B:
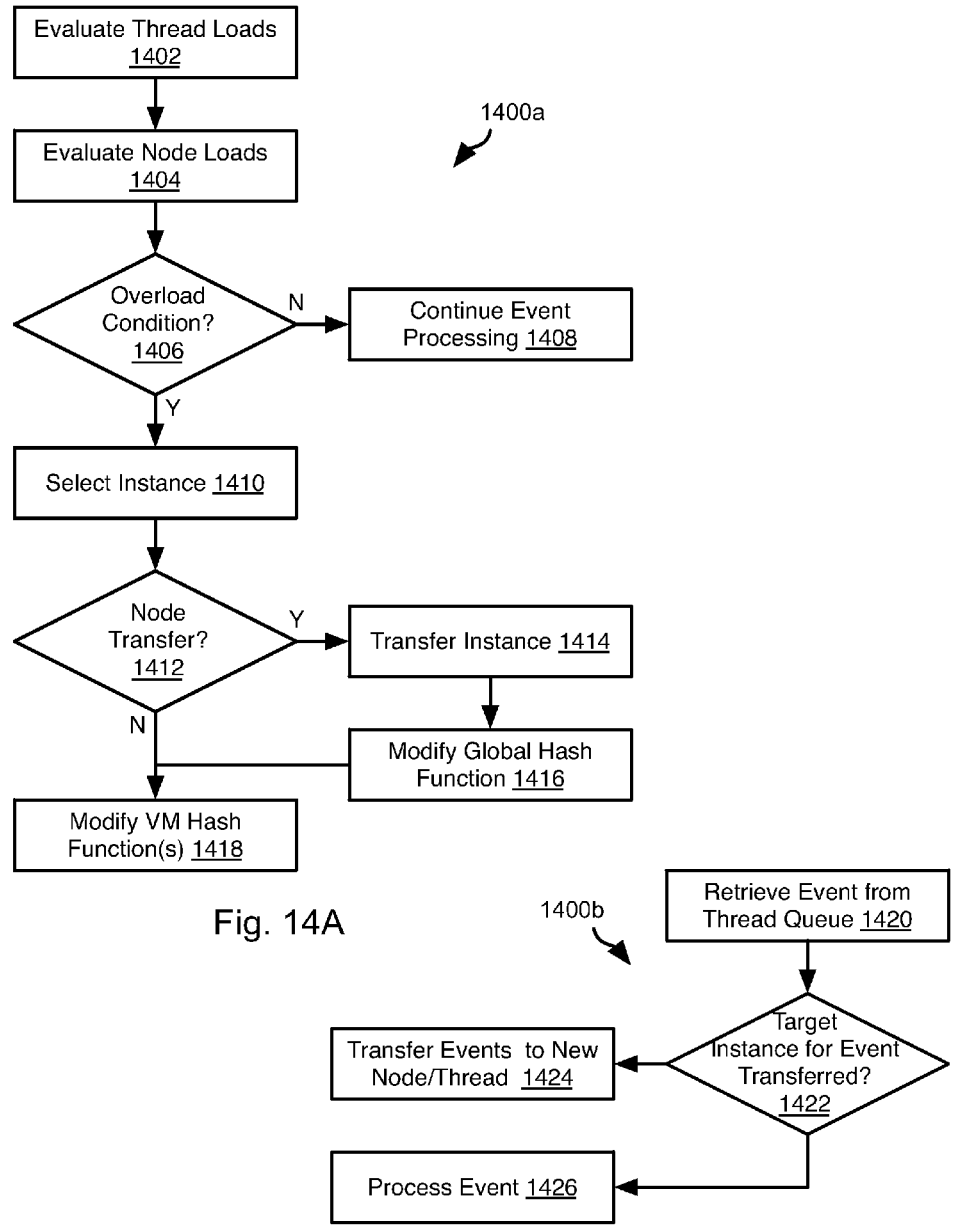
FIGS. 14A and 14B are process flow diagrams of methods for transferring event-processing instances between threads and nodes in accordance with an embodiment of the present invention.

FIGS. 14A and 14B illustrates methods 1400a, 1400b for reassigning instances of updaters or mappers among nodes and threads of an environment 600 in order to avoid overloading or for other purposes, such as dealing with a failed node. Referring to FIG. 14A, a method 1400a may include evaluating 1402 thread loading. Thread loading may be reported by the threads to the VM 610 and indicate a status of the thread queues of each thread. Alternatively, some other module or function may evaluate the thread queues. Evaluating 1402 thread loading may include evaluating which thread is heavily loaded and which threads are lightly loaded.

The method 1400a may further include evaluating 1404 node loads. Evaluating 1404 node loads may include calculating an aggregate load for a node according to a sum or other combination of the loading of the threads of that node. These aggregate loads may then be compared to determine the relative loading of various nodes in an environment 600. Other methods known in the art to determine loading of a computing system at the system or application level without information regarding the internal state of the VMs 610 of the nodes may also be used to determine node loading.

If an overload condition is not found 1406 to exist for any nodes or threads, then event processing of events 1408 may continue with a current assignments of instances to threads and nodes, such as, as defined according to a global hash function 604 and a hash function of the VM conductor 612. If an overload condition is found 1406 to exist, then one or more instances may be selected 1410 for transfer to another thread in the case of a thread is found 1406 to be overloaded or to another node in the case that a node is found 1406 to be overloaded. In some embodiments, instances selected to be transferred 140 may be those that are not currently hotspots, as defined and discussed hereinabove. The one or more instances selected 1410 for transfer may be the most lightly loaded, in terms of input events, for a thread or node.

If a node is found 1412 to be overloaded such that a node transfer is needed, then the selected instance may be transferred 1414 to the new node. A global hash function may also be modified 1416 to map the selected instance to a new node. In some embodiments, the global hash function may be modified 1416 prior to transfer 1414. The new node may preferably be a node determined to be less loaded than the former node for the selected instance. This may include transferring an instance object or merely attributes sufficient to define the instance on the new node inasmuch as each node may have access to all updater and mapper class definitions.

In the case of a node transfer, the VM hash function of the new node may be modified 1418 to map events to the selected instance and, in particular, to map events for the target instance to at least one thread, such as to a primary thread and secondary thread as discussed hereinabove. In the case where an instance is reassigned to a new thread, then the VM hash function may be modified 1418 to map events for the selected instance to the new thread, new primary thread, or new pair of primary and secondary threads. As for the node, the new thread for the selected instance may preferably be less heavily loaded than the former thread that was processing the selected instance.

Referring to FIG. 14B, after a selected instance has been assigned to one or both of a new node and a new thread, events for the selected instance may still be present in the thread queue of the former thread that was processing events according to the selected instance. Accordingly, the method 1400b may be executed for a period following reassignment. For example, the size of the queue for the former thread from the selected instance may be recorded at the time of reassignment. The method 1400b may then be performed for a number of events equal to the recorded size.

The method 1400b may include retrieving 1420 an event from the thread queue for the former thread and evaluating 1422 whether a target instance for the event has been transferred to a new thread or node. If so, then the event may be transferred 1424 to one or both of a new thread and new node for the target instance. This may include returning the event to one of the global conductor 602 or VM conductor 612 for reassignment to the queue of the new thread for the target instance. If the target instance for the event is not found 1422 to have been transferred, the event may be processed 1426 in the former thread.

The method 14B avoids the need to evaluate all of the events in a queue for the former thread at the expense of ordering of processing of events in the new thread. However, in many applications this is acceptable. In some applications where order is important, processing of events for the reassigned instance may be delayed until all events have been transferred from the queue for the former thread.

Figure 15:
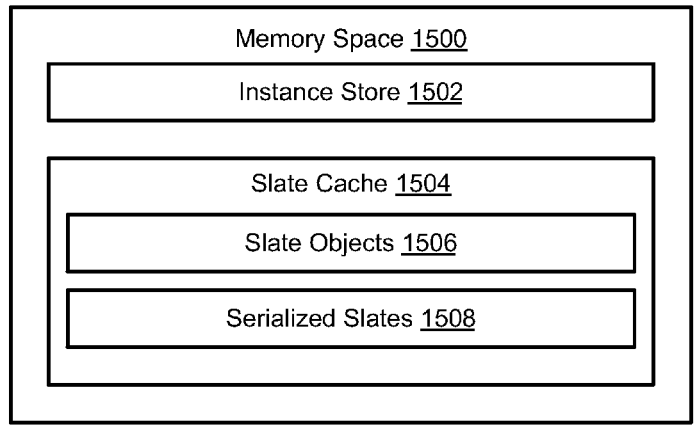
FIG. 15 is a schematic block diagram of data structures in a memory space of a node in a map-update network in accordance with an embodiment of the present invention.

FIG. 15 illustrates a memory space 1500 that may be accessed by threads of a VM 610. The memory space may include an instance store 1502 that stores instantiations of mapper and updater classes. The instance store 1502 may additionally store the class definitions for mapper and updater classes as well.

The memory space 1500 may also include a slate cache 1504 that stores copies of slates updated by updater instances associated with the VM 610. As already noted, the slate cache 1504 may store copies of slates for which persistent copies are stored in a persistent slate store 626. The slate cache 1504 may include two types of slates, slate object cache 1506 and serialized slate cache 1508. Each of these types of slates may include different forms of the same slates. A slate object cache 1506 may include objects that include more data than the raw slate data. For example, a slate object may be a Java object that includes attributes necessary to define such an object. In contrast, a serialized slate may contain raw slate data that is not readily accessed in an object-oriented application. However, the serialized slates may be suitable for transmission to a slate store 626 for storage or for transmission over a network.

Figure 16:
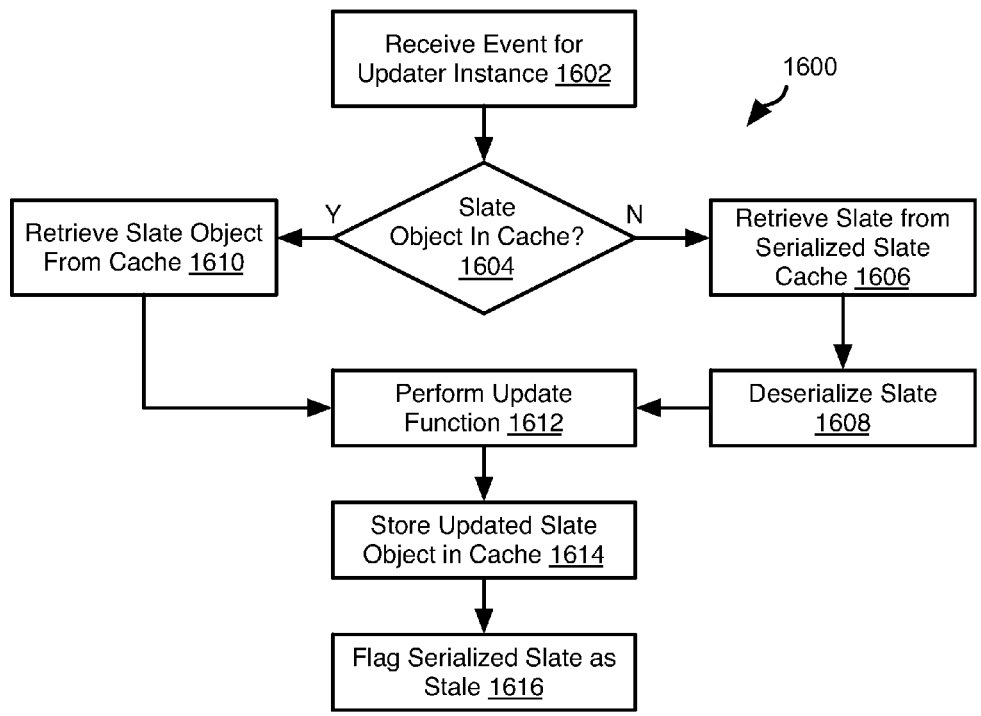
FIG. 16 is a process flow diagram of a method for updating cached serialized slates and slate objects in accordance with an embodiment of the present invention.

Referring to FIG. 16, a method 1600 may be used to reduce processing time required to obtain slate objects for processing within the threads of a VM 610. The method 1600 may include receiving 1602 an event targeted to an updater instance. The slate cache 1504 may be evaluated 1604 to determine whether a slate object corresponding to the slate of the updater instance is stored in the cache. If the corresponding slate object is not found 1604 to be in the slate cache, then the slate may be retrieved 1606 from one of the serialized slate cache 1508 or from a persistent slate store 626. The slate may then be deserialized 1608, which may include creating slate object corresponding to the serialized slate. The created slate object may be stored in the slate object cache 1506 or simply returned to the updater instance for performing an update method. If a slate object corresponding to the slate is found 1604 to be in the slate object cache 1506, then the slate object may be retrieved 1610 from the slate object cache 1506.

In either case, an update function is performed 1612 by the updater instance on the slate object according to a received event and the updated slate object is stored 1614 in the slate object cache 1506. The serialized slate in the serialized slate cache 1508 may be flagged 1616 as stale or otherwise invalid. In some embodiments, the updated slate object may be flagged as dirty or otherwise in need of flushing to the serialized slate cache 1508 and/or persistent slate store 626.

Figure 17:
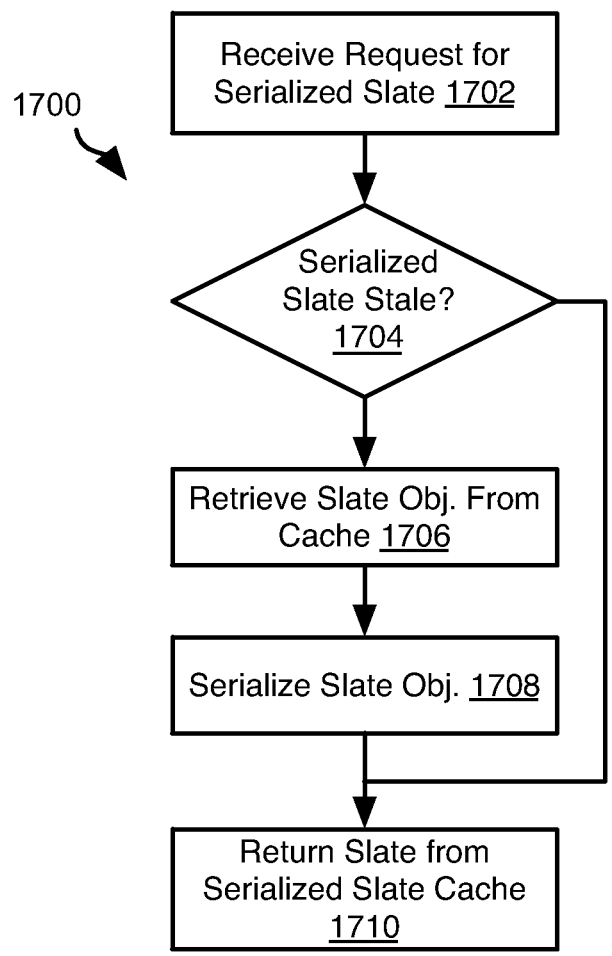
FIG. 17 is a process flow diagram of a method for retrieving a slate from a cache in accordance with an embodiment of the present invention.

FIG. 17 illustrates a method 1700 for retrieving a slate in embodiments storing slates in a slate cache 1504 including slate objects 1506 and serialized slates 1508. The method 1700 may be executed in a specialized thread or a thread that is not otherwise occupied with processing events in order to avoid slowing down threads that are hotspots for a particular target instances. The method 1700 may include receiving 1702 a request for a serialized slate. The request may come from any source. The slates accumulate information that may be useful or interesting. In particular, slate data may be available for viewing on a website. Accordingly, the request for a slate may be received in response to clicking a link or a scheduled update of data presented on a website or other software module for presenting slate information.

The method 1700 may include evaluating 1704 whether the serialized slate in the slate cache 1504 is stale or otherwise not current. This may include evaluating whether a slate object corresponding to the requested slate is flagged as dirty. If so, the slate object corresponding to the requested slate may be retrieved 1706 and serialized 1708 or otherwise converted to a serialized representation of the slate. In either case, a serialized slate is returned 1710 to a calling function or module, such as over a network.

Figure 18:
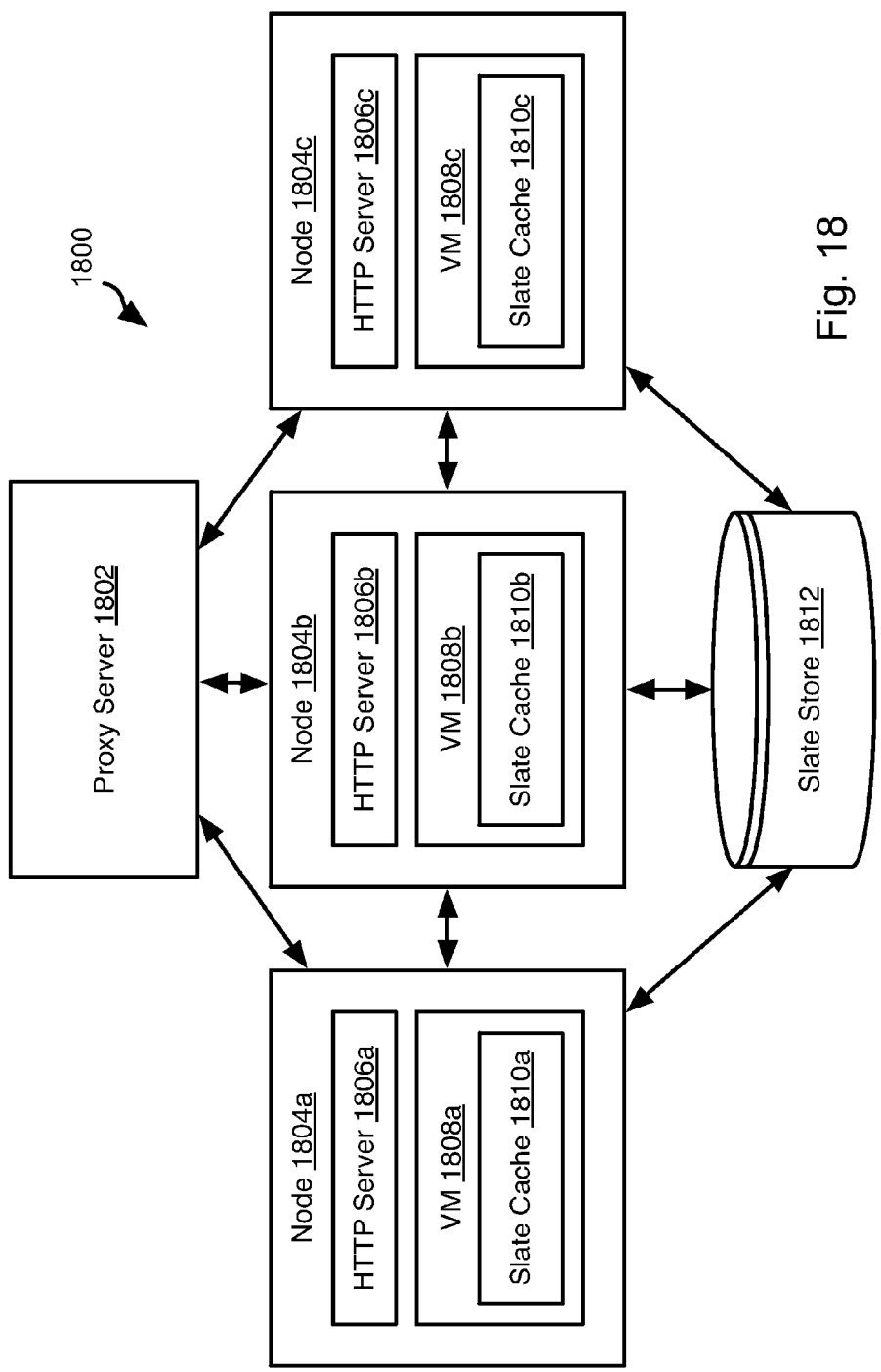
FIG. 18 is a schematic block diagram of an environment for responding to HTTP requests for slate data in accordance with an embodiment of the present invention.

FIG. 18 illustrates an environment 1800 for responding to HTTP requests for slate data. The environment 1800 may include a proxy server 1802. The proxy server 1802 may be embodied as any proxy server known in the art for receiving HTTP requests from a browser, forwarding these requests to a web server, receiving a response from the web server, and forwarding the response to a device that originated the HTTP request. In some embodiments, the proxy server 1802 may be caching proxy server. The proxy server 1802 may be hosted by a worker node or some other device in data communication with the worker nodes implementing a map-update application as discussed herein.

The proxy server 1802 may be in data communication with one or more worker nodes 1804a-1804c at least a portion of which host HTTP server 1806a-1806c. As already noted, worker nodes 1804a-1804c may include virtual machines (VM) 1808a-1808c operating as described herein above to process event streams in a multithreaded manner as discussed. As also already noted, each VM 1808a-1808c may include or be associated with a slate cache 1810a-1810c. The slate caches 1810 may cache copy of slates and maintain consistency with a slate store 1812.

The hosting of an HTTP server 1806a-1806c may advantageously enable request for slate from slate caches 1810a-1810c, which reduces time required to synchronize the slate caches 1810a-1820c with the persistent slate store 1812. In addition, the slate caches 1810a-1810c may be maintained in volatile memory with a faster access time as compared to the persistent slate store 1812.

Figure 19:
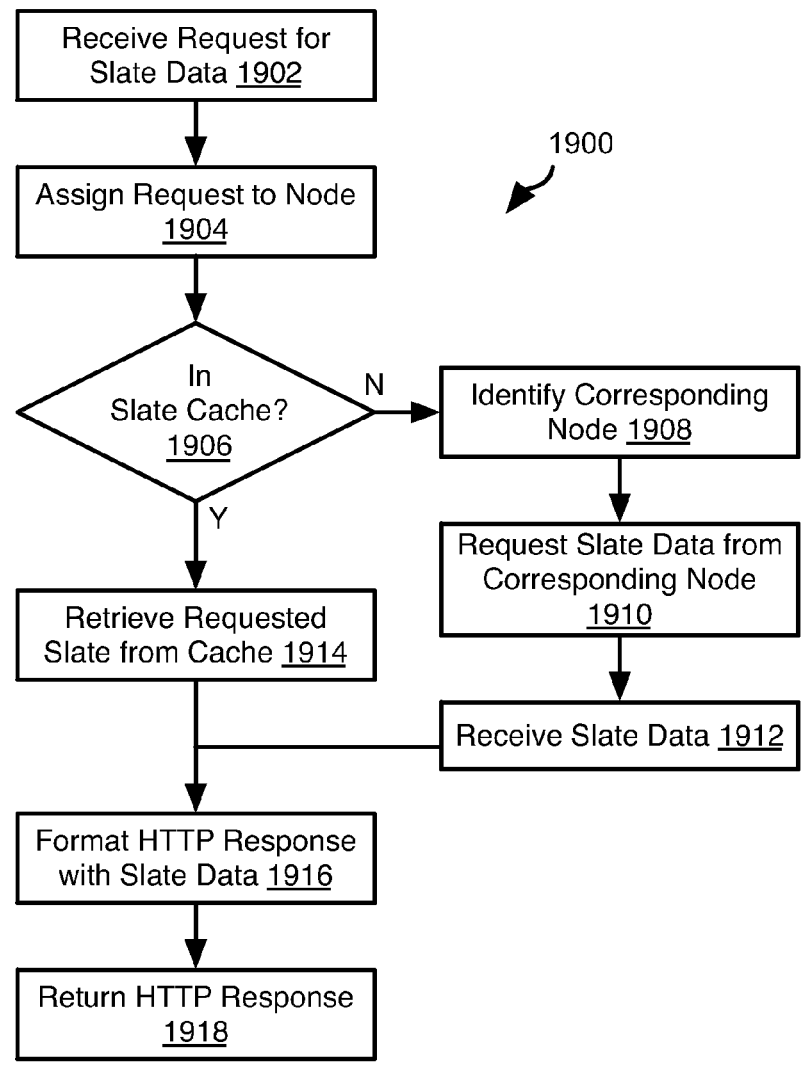
FIG. 19 is a process flow diagram of a method for responding to HTTP requests for slate data in accordance with an embodiment of the present invention.

FIG. 19 illustrates a method 1900 for responding to HTTP requests for slate data. The method 1900 may include receiving 1902 a request for slate data. The request may be received by the proxy server 1802. The proxy server 1802 may assign 1904 the request to one of the nodes 1804a-1804c, such as according to a load balancing routine.

Upon receiving the request, the assigned node 1804a-1804c may evaluate 1906 the request, and, in particular, whether the slate data identified in the request is stored in its slate cache 1810a-1810c. The request may identify the slate according to a slate key of the slate. If the requested slate is found 1906 to not be in the slate cache for the assigned node, the method 1900 may include identifying 1908 a node 1804a-1804c corresponding to the slate, i.e., that has a copy of the slate in its slate cache 1810a-1810c. This may include querying a hash function stored in the assigned node, querying the other nodes 1810a-1810c, or some other means of discovery. The slate identified in the HTTP request may be requested 1910 by the assigned node from the identified node storing the slate in its slate cache 1810a-1810b and the slate may be received 1912 in response to the identified node transmitting the slate to the assigned node.

If the requested slate is found 1906 in the slate cache 1810a-1810c of the assigned node, the requested slate may be retrieved 1914 from the slate cache 1810a-1810b thereof. Retrieving the requested slate from the slate cache 1810a-1810b may include performing the method 1700 discussed above.

In either case, the requested slate may be formatted 1916 or otherwise encapsulated into an HTTP response and the HTTP response may be returned 1918 to a requesting device, which may include routing the HTTP response through the proxy server 1802.

Figure 20:
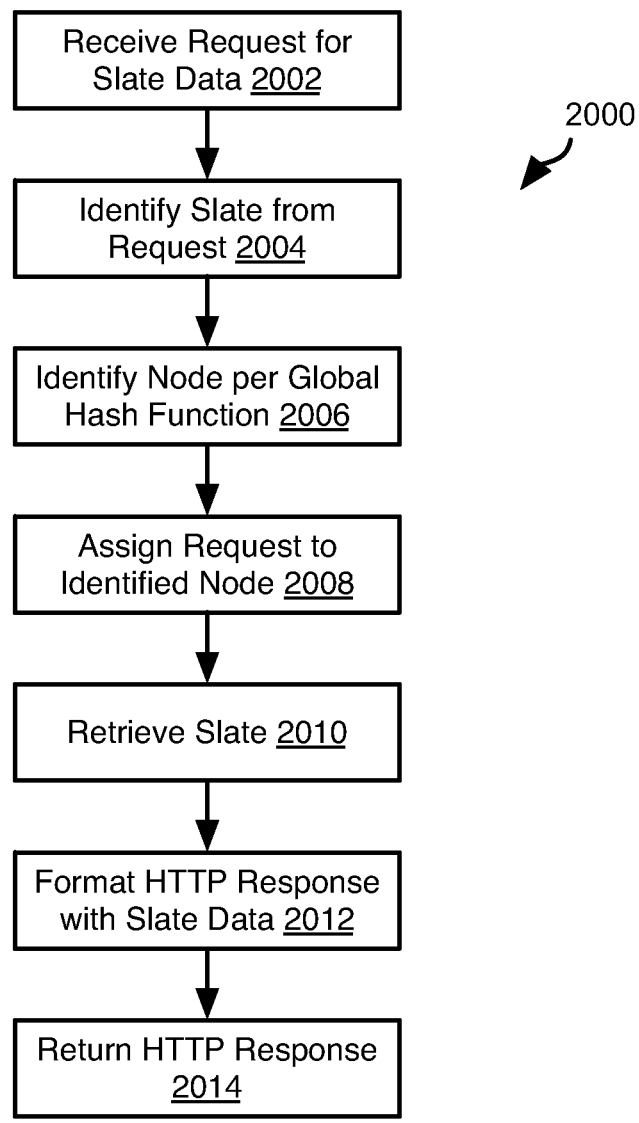
FIG. 20 is a process flow diagram of an alternative method for responding to HTTP requests for slate data in accordance with an embodiment of the present invention.

FIG. 20 illustrates an alternative method 2000 for responding to HTTP requests in an environment 1800. The method 2000 may include receiving 2002 a request for slate data. As for the method 1800 the request may reference, or be otherwise mapped, to a specific slate, such as by referencing a slate key. The method 2000 may additionally include identifying 2004 the requested slate reference by the request. Receiving 2002 the request and identifying 2004 the requested slate may be performed by the proxy server 1802.

The method 2000 may include identifying 2006 a node 1804a-1804c having the requested slate and assigning 2008 servicing of the request to the identified node. Identifying 2006 the correct node may include referencing a hash function, hash table, or other data, describing the contents of the slate caches 1810a-1810c of the various nodes 1804a-1804c.

Upon receiving the request, the assigned node may retrieve 2010 the slate 2010 from the slate cache 1810a-1810c for the assigned node. If in some circumstance, the slate is not located in the slate cache, retrieving 2010 the slate may include requesting and received the slate from the persistent slate store 1812. The slate data, or a requested portion thereof, may then be formatted 2012 into an HTTP response and returned 2014 to a requesting device, which may include routing the HTTP response through the proxy server 1802.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for performing event processing comprising:
    processing an event stream by an application executed by a computer system, the application comprising a plurality of event handlers, each event handler of the plurality of event handlers having an event key uniquely associated thereto and a slate object uniquely associated thereto, each event handler performing an event handling function with respect to events of the event stream having the event key of the each event handler, the event handling function including both of (a) updating a state of the slate object according to processing of each event of the event stream having the event key of the each event handler such that the slate object accumulates results of processing multiple events from the event stream having the event key of the each event handler and (b) publishing outputs to the event stream, the outputs indicating the state of the slate object;
    processing, by the computer system, using a particular event handler of the plurality of event handlers, a first portion of particular events of the event stream having the event key of the particular event handler and updating the state of the slate object of the particular event handler according to the first portion of the particular events;
    detecting an overload condition for the particular event handler;
    in response to detecting the overload condition, instantiating a plurality of partial handlers corresponding to the particular event handler;
    distributing a second portion of the particular events from the event stream having the event key of the particular event handler to the plurality of partial handlers;
    processing the second portion of the particular events to (a) update partial slate objects for each partial handler according to the event handling function such that the partial state object for each partial handler accumulates results of processing multiple events having the event key of the particular event handler and (b) generate partial output streams indicating states of the partial slate objects of each partial handler;
    aggregating the partial output streams of the plurality of partial handlers; and
    according to the aggregation, updating the state of the slate object of the particular event handler and publishing one or more aggregate output events to an output stream of the particular event handler, the one or more aggregate output events indicating the state of the slate object of the particular event handler.

2. The method of claim 1, further comprising:
detecting an excess capacity corresponding to the particular event handler; and
in response to detecting the excess capacity, eliminating at least one partial handler of the plurality of partial handlers.

3. The method of claim 2, wherein the at least one partial handler has at least one partial state associated therewith; and
wherein the eliminating the at least one partial handler comprises reporting the state of the partial slate object of the at least one partial handler to at least one partial output stream corresponding to the at least one partial handler of the plurality of partial handlers.

4. The method of claim 1, further comprising:
detecting an overload condition of the plurality of partial handlers; and
in response to detecting the overload condition, adding at least one partial handler to the plurality of partial handlers.

5. The method of claim 1, wherein the event stream includes a plurality of events each including an attribute and value pair.

6. A system for performing event processing comprising one or more processors and one or more memory devices operably coupled to the one or more processors, the one or more memory devices storing executable and operational code effective to cause the one or more processors to:
process an event stream by an application executed by the system, the application comprising a plurality of event handlers, each event handler of the plurality of event handlers having an event key uniquely associated thereto and a slate object uniquely associated thereto, each event handler configured to process an event handling function with respect to events of the event stream having the event key of the each event handler, the event handling function configured to both of (a) update a state of the slate object according to processing of each event of the event stream having the event key of the each event handler such that the slate object accumulates results of processing multiple events from the event stream having the event key of the each event handler and (b) publish outputs to the event stream, the outputs indicating the state of the slate object;
process using a particular event handler of the plurality of event handlers a first portion of particular events of the event stream having the event key of the particular event handler and updating the state of the slate object of the particular event handler according to the first portion of the particular events;
detect an overload condition for the particular event handler;
in response to detecting the overload condition, instantiate a plurality of partial handlers corresponding to the particular event handler;
distribute a second portion of particular events from the event stream having the event key of the particular event handler to the plurality of partial handlers;
process the second portion of events in the plurality of partial handlers to (a) update partial slate objects for each partial handler according to the event handling function such that the partial state object for each partial handler accumulates results of processing multiple events having the event key of the particular event handler and (b) generate partial output streams indicating states of the partial slates of each partial handler;
aggregate the partial output streams of the plurality of partial handlers; and
according to the aggregation, update the state of the slate object of the particular event handler and publishing one or more aggregate output events to an output stream of the particular event handler, the aggregate output events indicating the state of the slate object of the particular event handler.

7. The system of claim 6, wherein the executable and operational code are further effective to cause the one or more processors to;
detect an excess capacity corresponding to the particular event handler; and
in response to detecting the excess capacity, eliminate at least one partial handler of the plurality of partial handlers.

8. The system of claim 7, wherein the at least one partial handler has at least one partial state associated therewith; and
wherein the executable and operational code are further effective to cause the one or more processors to eliminate the at least one partial handler by reporting the at least one partial state to at least one partial output stream corresponding to the at least one partial handler of the plurality of partial handlers.

9. The system of claim 6, wherein the executable and operational code are further effective to cause the one or more processors to:
detect an overload condition of the plurality of partial event handlers; and
in response to detecting the overload condition, add at least one partial handler to the plurality of partial handlers.

10. The system of claim 6, wherein the event stream includes a plurality of events each including an attribute and value pair.

11. A computer program product for managing a transaction, the computer program product being embodied in a non-transitory computer readable storage medium and comprising computer instructions for:
processing an event stream by an application, the application comprising a plurality of event handlers, each event handler of the plurality of event handlers having an event key uniquely associated thereto and a slate object uniquely associated thereto, each event handler configured to process an event handling function with respect to events of the event stream having the event key of the each event handler, the event handling function configured to both of (a) update a state of the slate object according to processing of each event of the event stream having the event key of the each event handler such that the slate object accumulates results of processing multiple events from the event stream having the event key of the each event handler and (b) publish outputs to the event stream, the outputs indicating the state of the slate object;
processing using a particular event handler of the plurality of event handlers a first portion of particular events of the event stream having the event key of the particular event handler and updating the state of the slate object of the particular event handler according to the first portion of the particular events;
detecting an overload condition for the particular event handler;
in response to detecting the overload condition, instantiating a plurality of partial handlers corresponding to the particular event handler;

distributing a second portion of particular events from the event stream having the event key of the particular event handler to the plurality of partial handlers;

processing the second portion of events in the plurality of partial handlers to (a) update partial slate objects for each partial handler according to the event handling function such that the partial state object for each partial handler accumulates results of processing multiple events having the event key of the particular event handler and (b) generate partial output streams indicating states of the partial slates of each partial handler;

aggregating the partial output streams of the plurality of partial handlers; and according to the aggregation, updating the state of the slate object of the particular event handler and publishing one or more aggregate output events to an output stream of the particular event handler, the aggregate output events indicating the state of the slate object of the particular event handler.

12. The computer program product of claim 11, further comprising computer instructions for:

detecting an excess capacity corresponding to the particular event handler; and in response to detecting the excess capacity, eliminating at least one partial handler of the plurality of partial handlers.

13. The computer program product of claim 12, wherein the at least one partial handler has at least one partial state associated therewith; and wherein the eliminating the at least one partial handler comprises reporting the at least one partial state to at least one partial output stream corresponding to the at least one partial handler of the plurality of partial handlers.

14. The computer program product of claim 11, further comprising computer instructions for:

detecting an overload condition of the plurality of partial event handlers; and in response to detecting the overload condition, adding at least one partial handler to the plurality of partial handlers.

* * * * *